(12) United States Patent
Berget et al.

(10) Patent No.: US 9,715,304 B2
(45) Date of Patent: Jul. 25, 2017

(54) REGULAR VIA PATTERN FOR SENSOR-BASED INPUT DEVICE

(71) Applicant: SYNAPTICS INCORPORATED, San Jose, CA (US)

(72) Inventors: Damien Berget, Sunnyvale, CA (US); Joseph Kurth Reynolds, Alviso, CA (US); Stephen L. Morein, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 49 days.

(21) Appl. No.: 14/788,575

(22) Filed: Jun. 30, 2015

(65) Prior Publication Data

US 2017/0003791 A1  Jan. 5, 2017

(51) Int. Cl.
 *G06F 3/045* (2006.01)
 *G06F 3/041* (2006.01)
 *G06F 3/044* (2006.01)

(52) U.S. Cl.
 CPC .......... *G06F 3/0416* (2013.01); *G06F 3/044* (2013.01); *G06F 3/0412* (2013.01); *G06F 2203/04111* (2013.01)

(58) Field of Classification Search
 CPC ...... G06F 3/0412; G06F 3/0414; G06F 3/044; G06F 2300/0412
 USPC .................................. 345/173–178
 See application file for complete search history.

(56) References Cited

U.S. PATENT DOCUMENTS

| | | |
|---|---|---|
| 4,087,625 A | 5/1978 | Dym et al. |
| 4,233,522 A | 11/1980 | Grummer et al. |
| 4,237,421 A | 12/1980 | Waldron |
| 4,264,903 A | 4/1981 | Bigelow |
| 4,293,987 A | 10/1981 | Gottbreht et al. |
| 4,484,026 A | 11/1984 | Thornburg |
| 4,492,958 A | 1/1985 | Minami |
| 4,550,221 A | 10/1985 | Mabusth |

(Continued)

FOREIGN PATENT DOCUMENTS

| | | |
|---|---|---|
| CN | 2436978 Y | 6/2001 |
| CN | 1490713 A | 4/2004 |

(Continued)

OTHER PUBLICATIONS

International Search Report; PCT/US2013/021314 dated Jun. 25, 2013.

(Continued)

*Primary Examiner* — Vijay Shankar
(74) *Attorney, Agent, or Firm* — Patterson + Sheridan, LLP

(57) ABSTRACT

This disclosure generally describes an input device, a display device having an integrated capacitive sensing device, and an assembly for an input device. The input device comprises a plurality of sensor electrodes disposed in a first layer, and a processing system configured to detect presence of input objects in a sensing region defined proximate to the plurality of sensor electrodes. The input device further comprises a plurality of routing traces disposed in a second layer and coupled with the processing system, and a plurality of vias arranged in a regular pattern within an areal extent of the sensing region, wherein at least a portion of the plurality of vias couple the plurality of sensor electrodes with the plurality of routing traces.

20 Claims, 13 Drawing Sheets

(56) References Cited

U.S. PATENT DOCUMENTS

| | | | |
|---|---|---|---|
| 4,550,310 A | 10/1985 | Yamaguchi et al. |
| 4,659,874 A | 4/1987 | Landmeier |
| 4,667,259 A | 5/1987 | Uchida et al. |
| 4,677,259 A | 6/1987 | Abe |
| 4,705,919 A | 11/1987 | Dhawan |
| 4,771,138 A | 9/1988 | Dhawan |
| 4,878,013 A | 10/1989 | Andermo |
| 4,954,823 A | 9/1990 | Binstead |
| 4,999,462 A | 3/1991 | Purcell |
| 5,053,715 A | 10/1991 | Andermo |
| 5,062,916 A | 11/1991 | Aufderheide et al. |
| 5,239,307 A | 8/1993 | Andermo |
| 5,341,233 A | 8/1994 | Tomoike et al. |
| 5,459,463 A | 10/1995 | Gruaz et al. |
| 5,463,388 A | 10/1995 | Boie et al. |
| 5,650,597 A | 7/1997 | Redmayne |
| 5,657,012 A | 8/1997 | Tait |
| 5,777,596 A | 7/1998 | Herbert |
| 5,796,183 A | 8/1998 | Hourmand |
| 5,841,078 A | 11/1998 | Miller et al. |
| 5,869,790 A | 2/1999 | Shigetaka et al. |
| 5,914,465 A | 6/1999 | Allen et al. |
| 6,054,979 A | 4/2000 | Sellers |
| 6,188,391 B1 | 2/2001 | Seely et al. |
| 6,222,522 B1 | 4/2001 | Mathews et al. |
| 6,256,022 B1 | 7/2001 | Manaresi et al. |
| 6,281,888 B1 | 8/2001 | Hoffman et al. |
| 6,288,707 B1 | 9/2001 | Philipp |
| 6,297,811 B1 | 10/2001 | Kent et al. |
| 6,307,751 B1 | 10/2001 | Bodony et al. |
| 6,320,394 B1 | 11/2001 | Tartagni |
| 6,362,633 B1 | 3/2002 | Tartagni |
| 6,380,930 B1 | 4/2002 | Van Ruymbeke |
| 6,452,514 B1 | 9/2002 | Philipp |
| 6,459,044 B2 | 10/2002 | Watanabe et al. |
| 6,486,862 B1 | 11/2002 | Jacobsen et al. |
| 6,512,381 B2 | 1/2003 | Kramer |
| 6,535,200 B2 | 3/2003 | Philipp |
| 6,583,632 B2 | 6/2003 | Von Basse et al. |
| 6,653,736 B2 | 11/2003 | Kishimoto et al. |
| 6,731,120 B2 | 5/2004 | Tartagni |
| 6,771,327 B2 | 8/2004 | Sekiguchi |
| 6,825,833 B2 | 11/2004 | Mulligan et al. |
| 6,879,930 B2 | 4/2005 | Sinclair et al. |
| 6,910,634 B1 | 6/2005 | Inose et al. |
| 6,937,031 B2 | 8/2005 | Yoshioka et al. |
| 6,998,855 B2 | 2/2006 | Tartagni |
| 7,129,935 B2 | 10/2006 | Mackey |
| 7,158,125 B2 | 1/2007 | Sinclair et al. |
| 7,218,314 B2 | 5/2007 | Itoh |
| 7,306,144 B2 | 12/2007 | Moore |
| 7,327,352 B2 | 2/2008 | Keefer et al. |
| 7,339,579 B2 | 3/2008 | Richter et al. |
| 7,348,967 B2 | 3/2008 | Zadesky et al. |
| 7,382,139 B2 | 6/2008 | Mackey |
| 7,388,571 B2 | 6/2008 | Lowles et al. |
| 7,423,219 B2 | 9/2008 | Kawaguchi et al. |
| 7,423,635 B2 | 9/2008 | Taylor et al. |
| 7,439,962 B2 | 10/2008 | Reynolds et al. |
| 7,455,529 B2 | 11/2008 | Fujii et al. |
| 7,522,230 B2 | 4/2009 | Lee |
| 7,548,073 B2 | 6/2009 | Mackey et al. |
| 7,554,531 B2 | 6/2009 | Baker et al. |
| 7,589,713 B2 | 9/2009 | Sato |
| 7,663,607 B2 | 2/2010 | Hotelling et al. |
| 7,724,243 B2 | 5/2010 | Geaghan |
| 7,768,273 B1 | 8/2010 | Kalnitsky et al. |
| 7,786,981 B2 | 8/2010 | Proctor |
| 7,808,255 B2 | 10/2010 | Hristov et al. |
| 7,812,825 B2 | 10/2010 | Sinclair et al. |
| 7,821,274 B2 | 10/2010 | Philipp et al. |
| 7,821,502 B2 | 10/2010 | Hristov |
| 7,859,521 B2 | 12/2010 | Hotelling et al. |
| 7,864,160 B2 | 1/2011 | Geaghan et al. |
| 7,868,874 B2 | 1/2011 | Reynolds |
| 7,876,309 B2 | 1/2011 | XiaoPing |
| 7,973,771 B2 | 7/2011 | Geaghan |
| 7,977,953 B2 | 7/2011 | Lee |
| 7,986,152 B2 | 7/2011 | Philipp et al. |
| 8,040,326 B2 | 10/2011 | Hotelling et al. |
| 8,059,015 B2 | 11/2011 | Hua et al. |
| 8,125,463 B2 | 2/2012 | Hotelling et al. |
| 8,169,568 B2 | 5/2012 | Kim |
| 8,243,027 B2 | 8/2012 | Hotelling et al. |
| 8,258,986 B2 | 9/2012 | Makovetskyy |
| 8,259,078 B2 | 9/2012 | Hotelling et al. |
| 8,278,571 B2 | 10/2012 | Orsley |
| 8,305,359 B2 | 11/2012 | Bolender et al. |
| 8,319,747 B2 | 11/2012 | Hotelling et al. |
| 8,723,841 B2 * | 5/2014 | Ishizaki ............... G06F 3/044 178/18.01 |
| 8,766,950 B1 * | 7/2014 | Morein ................. G06F 3/044 345/173 |
| 8,860,685 B2 * | 10/2014 | Takeuchi .............. G06F 3/0412 178/18.06 |
| 9,244,581 B2 * | 1/2016 | Morein ................. G06F 3/0412 |
| 2002/0077313 A1 | 6/2002 | Clayman |
| 2003/0052867 A1 | 3/2003 | Shigetaka et al. |
| 2003/0103043 A1 | 6/2003 | Mulligan et al. |
| 2003/0234771 A1 | 12/2003 | Mulligan et al. |
| 2004/0062012 A1 | 4/2004 | Murohara |
| 2004/0077313 A1 | 4/2004 | Oba et al. |
| 2004/0125087 A1 | 7/2004 | Taylor et al. |
| 2004/0222974 A1 | 11/2004 | Hong et al. |
| 2004/0239650 A1 | 12/2004 | Mackey |
| 2004/0252109 A1 | 12/2004 | Trent et al. |
| 2005/0030048 A1 | 2/2005 | Bolender et al. |
| 2006/0038754 A1 | 2/2006 | Kim |
| 2006/0097991 A1 | 5/2006 | Hotelling et al. |
| 2006/0114240 A1 | 6/2006 | Lin |
| 2006/0114241 A1 | 6/2006 | Lin |
| 2006/0232600 A1 | 10/2006 | Kimura et al. |
| 2007/0008299 A1 | 1/2007 | Hristov |
| 2007/0222762 A1 | 9/2007 | Van Delden et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0242054 A1 | 10/2007 | Chang et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0268265 A1 | 11/2007 | XiaoPing |
| 2007/0273659 A1 | 11/2007 | XiaoPing et al. |
| 2007/0273660 A1 | 11/2007 | XiaoPing |
| 2007/0279395 A1 | 12/2007 | Philipp et al. |
| 2007/0291009 A1 | 12/2007 | Wright et al. |
| 2008/0006453 A1 | 1/2008 | Hotelling |
| 2008/0007534 A1 | 1/2008 | Peng et al. |
| 2008/0062140 A1 | 3/2008 | Hotelling et al. |
| 2008/0062147 A1 | 3/2008 | Hotelling et al. |
| 2008/0074398 A1 | 3/2008 | Wright |
| 2008/0111795 A1 | 5/2008 | Bollinger |
| 2008/0117182 A1 | 5/2008 | Um et al. |
| 2008/0150906 A1 | 6/2008 | Grivna |
| 2008/0157782 A1 | 7/2008 | Krah |
| 2008/0158172 A1 | 7/2008 | Hotelling et al. |
| 2008/0158181 A1 | 7/2008 | Hamblin et al. |
| 2008/0164076 A1 | 7/2008 | Orsley |
| 2008/0218488 A1 | 9/2008 | Yang et al. |
| 2008/0245582 A1 | 10/2008 | Bytheway |
| 2008/0246723 A1 | 10/2008 | Baumbach |
| 2008/0259044 A1 | 10/2008 | Utsunomiya et al. |
| 2008/0264699 A1 | 10/2008 | Chang et al. |
| 2008/0265914 A1 | 10/2008 | Matsushima |
| 2008/0297176 A1 | 12/2008 | Douglas |
| 2008/0308323 A1 | 12/2008 | Huang et al. |
| 2008/0309635 A1 | 12/2008 | Matsuo |
| 2009/0002337 A1 | 1/2009 | Chang |
| 2009/0002338 A1 | 1/2009 | Kinoshita et al. |
| 2009/0040191 A1 | 2/2009 | Tong et al. |
| 2009/0046077 A1 | 2/2009 | Tanaka et al. |
| 2009/0091551 A1 | 4/2009 | Hotelling et al. |
| 2009/0096757 A1 | 4/2009 | Hotelling et al. |

(56) References Cited

U.S. PATENT DOCUMENTS

| | | |
|---|---|---|
| 2009/0107737 A1 | 4/2009 | Reynolds et al. |
| 2009/0128518 A1 | 5/2009 | Kinoshita et al. |
| 2009/0135151 A1 | 5/2009 | Sun |
| 2009/0153509 A1 | 6/2009 | Jiang et al. |
| 2009/0160682 A1 | 6/2009 | Bolender et al. |
| 2009/0185100 A1 | 7/2009 | Matsuhira et al. |
| 2009/0194344 A1 | 8/2009 | Harley et al. |
| 2009/0201267 A1 | 8/2009 | Akimoto et al. |
| 2009/0207154 A1 | 8/2009 | Chino |
| 2009/0213082 A1 | 8/2009 | Ku |
| 2009/0213534 A1 | 8/2009 | Sakai |
| 2009/0236151 A1 | 9/2009 | Yeh et al. |
| 2009/0262096 A1 | 10/2009 | Teramoto |
| 2009/0267916 A1 | 10/2009 | Hotelling |
| 2009/0273571 A1 | 11/2009 | Bowens |
| 2009/0273573 A1 | 11/2009 | Hotelling |
| 2009/0277695 A1 | 11/2009 | Liu et al. |
| 2009/0283340 A1 | 11/2009 | Liu et al. |
| 2009/0284495 A1 | 11/2009 | Geaghan et al. |
| 2009/0303203 A1 | 12/2009 | Yilmaz et al. |
| 2009/0309850 A1 | 12/2009 | Yang |
| 2009/0314621 A1 | 12/2009 | Hotelling |
| 2009/0322702 A1 | 12/2009 | Chien et al. |
| 2009/0324621 A1 | 12/2009 | Senter et al. |
| 2010/0001966 A1 | 1/2010 | Lii et al. |
| 2010/0001973 A1 | 1/2010 | Hotelling et al. |
| 2010/0006347 A1 | 1/2010 | Yang |
| 2010/0013745 A1 | 1/2010 | Kim et al. |
| 2010/0013800 A1 | 1/2010 | Elias et al. |
| 2010/0044122 A1 | 2/2010 | Sleeman et al. |
| 2010/0060608 A1 | 3/2010 | Yousefpor |
| 2010/0090979 A1 | 4/2010 | Bae |
| 2010/0134422 A1 | 6/2010 | Borras |
| 2010/0140359 A1 | 6/2010 | Hamm et al. |
| 2010/0144391 A1 | 6/2010 | Chang et al. |
| 2010/0147600 A1 | 6/2010 | Orsley |
| 2010/0149108 A1 | 6/2010 | Hotelling et al. |
| 2010/0156839 A1 | 6/2010 | Ellis |
| 2010/0163394 A1 | 7/2010 | Tang et al. |
| 2010/0164889 A1 | 7/2010 | Hristov et al. |
| 2010/0182273 A1 | 7/2010 | Noguchi et al. |
| 2010/0188359 A1 | 7/2010 | Lee |
| 2010/0193257 A1 | 8/2010 | Hotelling et al. |
| 2010/0194695 A1 | 8/2010 | Hotelling et al. |
| 2010/0194697 A1 | 8/2010 | Hotelling et al. |
| 2010/0214247 A1 | 8/2010 | Tang et al. |
| 2010/0220075 A1 | 9/2010 | Kuo et al. |
| 2010/0245286 A1 | 9/2010 | Parker |
| 2010/0258360 A1 | 10/2010 | Yilmaz |
| 2010/0265210 A1 | 10/2010 | Nakanishi et al. |
| 2010/0271330 A1 | 10/2010 | Philipp |
| 2010/0277433 A1 | 11/2010 | Lee et al. |
| 2010/0289770 A1 | 11/2010 | Lee et al. |
| 2010/0291973 A1 | 11/2010 | Nakahara et al. |
| 2010/0292945 A1 | 11/2010 | Reynolds et al. |
| 2010/0302201 A1 | 12/2010 | Ritter et al. |
| 2010/0302202 A1* | 12/2010 | Takeuchi ............ G06F 3/0412 345/174 |
| 2010/0321043 A1 | 12/2010 | Philipp et al. |
| 2010/0321326 A1 | 12/2010 | Grunthaner et al. |
| 2010/0328259 A1* | 12/2010 | Ishizaki ............. G06F 3/044 345/174 |
| 2011/0006832 A1 | 1/2011 | Land et al. |
| 2011/0006999 A1 | 1/2011 | Chang et al. |
| 2011/0007030 A1 | 1/2011 | Mo et al. |
| 2011/0018841 A1 | 1/2011 | Hristov |
| 2011/0022351 A1 | 1/2011 | Philipp et al. |
| 2011/0025629 A1 | 2/2011 | Grivna et al. |
| 2011/0025635 A1 | 2/2011 | Lee |
| 2011/0025639 A1 | 2/2011 | Trend et al. |
| 2011/0048812 A1 | 3/2011 | Yilmaz |
| 2011/0048813 A1 | 3/2011 | Yilmaz |
| 2011/0057887 A1 | 3/2011 | Lin et al. |
| 2011/0061949 A1 | 3/2011 | Krah et al. |
| 2011/0062969 A1 | 3/2011 | Hargreaves et al. |
| 2011/0062971 A1 | 3/2011 | Badaye |
| 2011/0063251 A1 | 3/2011 | Geaghan et al. |
| 2011/0080357 A1 | 4/2011 | Park et al. |
| 2011/0090159 A1 | 4/2011 | Kurashima |
| 2011/0096016 A1 | 4/2011 | Yilmaz |
| 2011/0109579 A1 | 5/2011 | Wang et al. |
| 2011/0109590 A1 | 5/2011 | Park |
| 2011/0141051 A1 | 6/2011 | Ryu |
| 2011/0169770 A1 | 7/2011 | Mishina et al. |
| 2011/0187666 A1 | 8/2011 | Min |
| 2011/0242444 A1 | 10/2011 | Song |
| 2011/0248949 A1 | 10/2011 | Chang et al. |
| 2011/0267300 A1 | 11/2011 | Serban et al. |
| 2011/0267305 A1 | 11/2011 | Shahparnia et al. |
| 2011/0273391 A1 | 11/2011 | Bae |
| 2011/0279400 A1 | 11/2011 | Yilmaz |
| 2011/0298746 A1 | 12/2011 | Hotelling |
| 2012/0038585 A1 | 2/2012 | Kim |
| 2012/0043971 A1 | 2/2012 | Maharyta |
| 2012/0044171 A1 | 2/2012 | Lee et al. |
| 2012/0056820 A1 | 3/2012 | Corbridge |
| 2012/0081335 A1 | 4/2012 | Land et al. |
| 2012/0218199 A1 | 8/2012 | Kim et al. |
| 2012/0313901 A1 | 12/2012 | Monson |
| 2013/0057507 A1 | 3/2013 | Shin et al. |
| 2013/0088372 A1 | 4/2013 | Lundstrum et al. |
| 2013/0162570 A1 | 6/2013 | Shin et al. |
| 2013/0173211 A1 | 7/2013 | Hoch et al. |
| 2013/0215075 A1 | 8/2013 | Lee et al. |
| 2013/0321296 A1 | 12/2013 | Lee et al. |
| 2013/0342770 A1 | 12/2013 | Kim et al. |
| 2015/0002466 A1* | 1/2015 | Takeuchi ............ G06F 3/0412 345/174 |
| 2015/0309531 A1* | 10/2015 | Tanemura ............ G06F 1/16 345/174 |

FOREIGN PATENT DOCUMENTS

| | | |
|---|---|---|
| EP | 0810540 A2 | 12/1997 |
| EP | 0919945 A2 | 6/1999 |
| EP | 0977159 A1 | 2/2000 |
| JP | 2002-215330 A | 8/2002 |
| JP | 2002-268768 A | 9/2002 |
| JP | 2002268786 A | 9/2002 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| KR | 10110118065 | 1/2012 |
| WO | WO-86/06551 A1 | 11/1986 |
| WO | WO-0057344 A1 | 9/2000 |
| WO | WO-2010117946 A2 | 10/2010 |
| WO | WO-2010136932 A1 | 12/2010 |

OTHER PUBLICATIONS

Quantum Research Group. "Qmatrix Technology White Paper", 2006. 4 Pages.

Lubart, et al. "One Layer Optically Transparent Keyboard for Input Display", IP.com. Mar. 1, 1979. 3 Pages.

Gary L. Barrett et al. "Projected Capacitive Touch Screens", iTouchInternational. 9 pages.

Quantum Research Application Note An—KD01. "Qmatrix Panel Design Guidelines", Oct. 10, 2002. 4 Pages.

Calvin Wang et al. "Single Side All-Point-Addressable Clear Glass Substrate Sensor Design", IP.com. Apr. 2, 2009. 3 Pages.

Tsz-Kin Ho et al. "32.3: Simple Single-Layer Multi-Touch Projected Capacitive Touch Panel", SID 09 Digest.

Johannes Schoning et al. "Multi-Touch Surfaces: A Technical Guide", Technical Report TUM-I0833. 2008.

Shawn Day. "Low Cost Touch Sensor on the Underside of a Casing", IP.com. October 14, 2004.

Ken Gilleo. "The Circuit Centennial", 16 Pages.

Ken Gilleo, "The Definitive History of the Printed Circuit", 1999 PC Fab.

(56) References Cited

OTHER PUBLICATIONS

Hal Philipp. "Charge Transfer Sensing", vol. 19, No. 2. 1999. pp. 96-105.
Paul Leopardi, "A Partition of the Unit Sphere into Regions of Equal Area and Small Diameter", 2005.
Olivier Bau, "TeslaTouch: Electrovibration for Touch Surfaces", 2010.
Colin Holland. "SID: Single Layer Technology Boosts Capacitive Touchscreens", www.eetimes.com/General. 2011.
"Novel Single Layer Touchscreen Based on Indium", 2011.
"Mesh Patterns for Capacitive Touch or Proximity Sensors", IP.com. May 14, 2010. 3pages.
"IDT Claims World's First True Single-Layer Multi-Touch Projected Capacitive Touch Screen Technology", EE Times Europe. Dec. 8, 2010.
Tracy V. Wilson et al. "How the iPhone Works", HowStuffWorks "Multi-touch Systems". 2011.
Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.
Mike Williams, "Dream Screens from Graphene", Technology Developed at Rice could Revolutionize Touch-Screen Displays. Aug. 2011.
ASIC Packaging Guidebook, Toshiba Corporation. (2000). 35 pages.
Fujitsu Microelectronics Limited. "IC Package." (2002). 10 pages.
International Search Report, PCT/US2013/021314 dated Jun. 25, 2013.

\* cited by examiner

REGULAR VIA PATTERN FOR SENSOR-BASED INPUT DEVICE

BACKGROUND

Field

Embodiments of the present disclosure generally relate to electronic devices.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY

One embodiment described herein includes an input device comprising a plurality of sensor electrodes disposed in a first layer, and a processing system configured to detect presence of input objects in a sensing region defined proximate to the plurality of sensor electrodes. The input device further comprises a plurality of routing traces disposed in a second layer and coupled with the processing system, and a plurality of vias arranged in a regular pattern within an areal extent of the sensing region, wherein at least a portion of the plurality of vias couple the plurality of sensor electrodes with the plurality of routing traces.

Another embodiment described herein includes a display device having an integrated capacitive sensing device, the display device comprising a plurality of source lines configured to perform display updating, and a plurality of routing traces, at least one of the plurality of routing traces being disposed parallel to at least one of the plurality of source lines. The display device further comprises a plurality of sensor electrodes configured to perform capacitive sensing of input objects in a sensing region defined proximate to the plurality of sensor electrodes, each sensor electrode corresponding to one or more segments of a common voltage electrode, and a plurality of vias arranged in a regular pattern with an areal extent of the sensing region, wherein at least a portion of the plurality of vias couple the plurality of sensor electrodes with the plurality of routing traces.

Another embodiment described herein includes an assembly for an input device, the assembly comprising a plurality of sensor electrodes disposed in a first layer and arranged to define a sensing region, a plurality of routing traces disposed in a second layer and configured to couple with a processing system, and a plurality of vias arranged in a regular pattern within an areal extent of the sensing region, wherein at least a portion of the plurality of vias couple the plurality of sensor electrodes with the plurality of routing traces.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
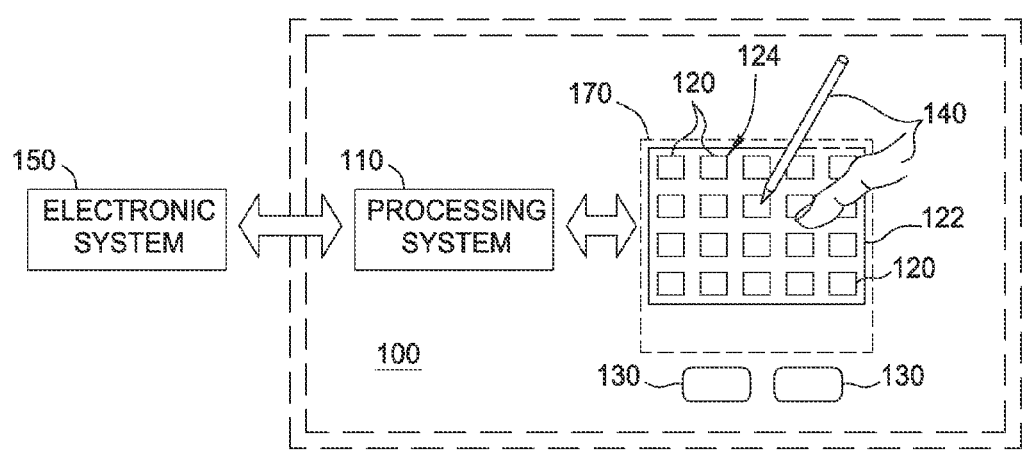
FIG. 1 is a schematic block diagram of an exemplary input device, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present disclosure relate to an input device comprising a plurality of vias disposed in a regular pattern. The plurality of vias are used to connect a plurality of sensor electrodes disposed in a first layer with a plurality of routing traces disposed in a second layer. In turn, the sensor electrodes and routing traces are configured to couple with a processing system that performs input sensing. The regular pattern of the plurality of vias corresponds to an areal extent of a sensing region defined proximate to the sensor electrodes. Some embodiments may further include dummy vias included in the regular pattern of the plurality of vias.

Disposing the plurality of vias in a regular pattern permits a simpler process of visual inspection during production, as a camera or other visual sensing device may have a reduced number of changes to orientation, position, etc. to detect all of the vias. In some cases, the regular pattern of vias increases the uniformity of the input device, which can increase the reliability of its operation. In some cases the regular pattern of vias can reduce the number of lines or traces formed or otherwise included in the input device. In these cases, the traces can be cut or otherwise segmented to provide desired via connections with the sensor electrodes. Such a feature permits the input device to be customized for use with a particular processing system. For example, multiplexing capabilities of different processing systems may vary, so that the traces of the input device may be cut differently in order to connect with the target processing system. The desired connections may be made between the processing system and certain sensor electrodes by cutting or segmenting the traces.

FIG. 1 is a schematic block diagram of an input device 100 in accordance with embodiments of the present technology. In one embodiment, input device 100 comprises a display device comprising an integrated sensing device. Although the illustrated embodiments of the present disclosure are shown integrated with a display device, it is contemplated that the invention may be embodied in the input devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing elements 124 for detecting user input. The sensing elements 124 include a plurality of sensor electrodes 120 and one or more grid electrodes 122. As several non-limiting examples of sensing technologies, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 124 detect loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 124 to create electric fields. In some capacitive implementations, separate sensing elements 124 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground), and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit a transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) 124 of the input device 100. In other embodiments, components of processing system 110 are physically separate with one or more components close to sensing element(s) 124 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) 124 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) 124 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing elements 124. As another example, the processing system 110 may perform filtering, demodulation or other signal conditioning. In various embodiments processing system 110 generates a capacitive image directly from the resulting signals received with sensing elements 124 (sensor electrodes 120). In other embodiments, processing system 110 spatially filters (e.g., taking a difference, weighted sum of neighboring elements) the resulting signals received with sensing elements 124 (or sensor electrodes 120) to generate a sharpened or averaged image. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing elements 124 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing (e.g., the active matrix control electrodes configured to control the source, gate, and/or Vcom voltages). Shared components may include display electrodes, substrates, connectors, and/or connections. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other suitable storage technology.

Figure 2:
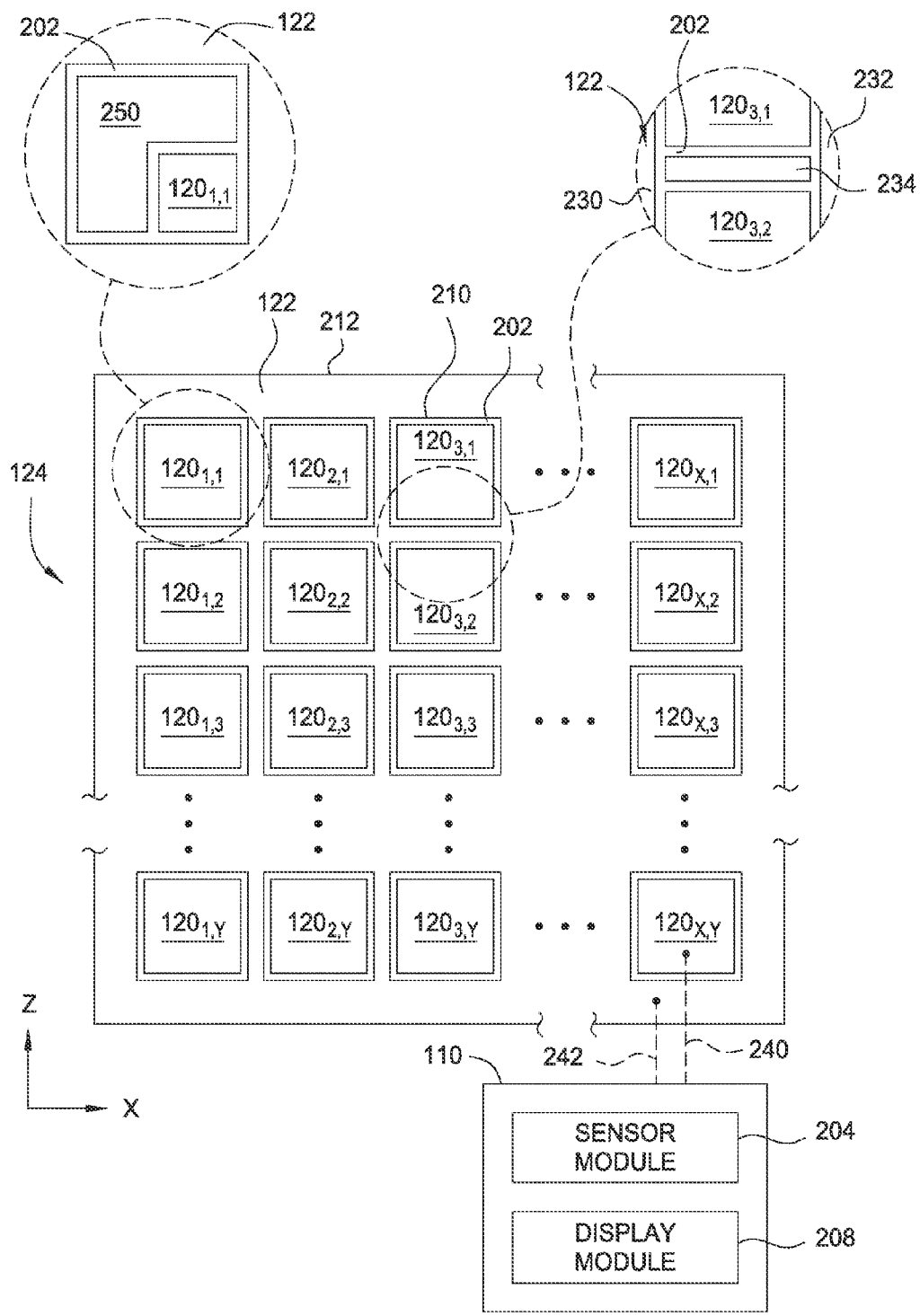
FIG. 2 illustrates a simplified exemplary array of sensor elements that may be used in an input device, according to one embodiment.

FIG. 2 shows a portion of an exemplary pattern of sensing elements 124 configured to sense in the sensing region 170 associated with the pattern, according to some embodiments. For clarity of illustration and description, FIG. 2 shows the sensor electrodes 120 of the sensing elements 124 in a pattern of simple rectangles with the grid electrode 222 disposed therebetween, and does not show various other components. The exemplary pattern of sensing elements 124 comprises an array of sensor electrodes $120_{X,Y}$ (referred collectively as sensor electrodes 120) arranged in X columns and Y rows, wherein X and Y are positive integers, although one of X and Y may be zero. It is contemplated that the pattern of sensing elements 124 may comprises a plurality of sensor electrodes 120 having other configurations, such as polar arrays, repeating patters, non-repeating patterns, a single row or column, or other suitable arrangement. Further, in various embodiments the number of sensor electrodes may vary from row to row and/or column to column. In one embodiment, at least one row and/or column of sensor electrodes 120 is offset from the others, such it extends further in at least one direction than the others. The sensor electrodes 120 and grid electrodes 122 are coupled to the processing system 110 and utilized to determine the presence (or lack thereof) of an input object 140 in the sensing region 170.

In a first mode of operation, the arrangement of sensor electrodes 120 ($120_{1-1}$, $120_{2-1}$, $120_{3-1}$, $120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

The sensor electrodes 120 are typically ohmically isolated from each other, and also ohmically isolated from the grid electrode 122. That is, one or more insulators separate the sensor electrodes 120 (and grid electrode 122) and prevent them from electrically shorting to each other. In some embodiments, the sensor electrodes 120 and grid electrode 122 are separated by insulative gap 202. The insulative gap 202 separating the sensor electrodes 120 and grid electrode 122 may be filled with an electrically insulating material, or may be an air gap. In some embodiments, the sensor electrodes 120 and the grid electrode 122 are vertically separated by one or more layers of insulative material. In some other embodiments, the sensor electrodes 120 and the grid electrode 122 are separated by one or more substrates; for example, they may be disposed on opposite sides of the same substrate, or on different substrates. In yet other embodiments, the grid electrode 122 may be composed of multiple layers on the same substrate, or on different substrates. In one embodiment, a first grid electrode may be formed on a first substrate or first side of a substrate and a second grid electrode may be formed on a second substrate or a second side of a substrate. For example, a first grid comprises one or more common electrodes disposed on a TFT layer of the display device 160 and a second grid electrode is disposed on the color filter glass of the display device 160. In one embodiment, the dimensions of the first grid electrode are equal to the dimensions of the second grid electrode. In one embodiment, at least one dimension of the first grid electrode differs from a dimension of the second grid electrode. For example, the first grid electrode may be configured such that it is disposed between a first and second sensor electrode 120 and the second grid electrode may be configured such that it overlaps at least one of the first and second sensor electrodes 120 and the first grid electrode. Further, the first grid electrode may be configured such that it is disposed between a first and second sensor electrode 120 and the second grid electrode may be configured such that it only overlaps the first grid electrode and is smaller than the first grid electrode.

In a second mode of operation, the sensor electrodes 120 (120$_{1\text{-}1}$, 120$_{2\text{-}1}$, 120$_{3\text{-}1}$, 120$_{X,Y}$) may be utilized to detect the presence of an input object via transcapacitive sensing techniques when a transmitter signal is driven onto the grid electrode 122. That is, processing system 110 is configured to drive the grid electrode 122 with a transmitter signal and to receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage in the first mode of operation, between the sensor electrodes 120 and grid electrode 122 in the second mode of operation, and between groups of sensor electrodes 120 used as transmitter and receiver electrodes. The capacitive coupling changes with the proximity and motion of input objects 140 in the sensing region 170 associated with the sensing elements 124, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or such that multiple transmitter electrodes transmit at the same time. Where multiple transmitter electrodes transmit simultaneously, the multiple transmitter electrodes may transmit the same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes are received with using a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made, as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode with a transmitter or other signal and/or voltage potential. In one embodiment, the switching element may be configured to couple more than one receiver electrode to a common receiver at the same time.

In other embodiments, "scanning" sensor electrodes 120 to determine these capacitive couplings comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment, each of the sensor electrodes 120 are simultaneously driven and received with, obtaining an absolute capacitive measurement simultaneously from each of the sensor electrodes 120. In various embodiments, processing system 110 may be configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least a portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a coarse capacitive image that may not be usable to discern precise positional information. However, a coarse capacitive image may be used to sense presence of an input object. In one embodiment, the coarse capacitive image may be used to move processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move a host IC out of a "doze" mode or low-power mode. The coarse capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground, or due to stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the active matrix display such as one or more segments of a segmented Vcom electrode (common electrode(s)), a source drive line, gate line, an anode sub-pixel electrode or cathode pixel electrode, or any other display element. These display electrodes may be disposed on an appropriate display screen substrate. For example, the common electrodes may be disposed on the a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode 122 comprise one or more common electrodes, various other display electrodes as describe above may also be used in conjunction with the common electrode or as an alternative to the common electrodes. In various embodiments, the sensor electrodes 120 and grid electrode 122 comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 2, the processing system 110 coupled to the sensor electrodes 120 includes a sensor module 204 and optionally, a display driver module 208. The sensor module 204 includes circuitry configured to drive at least one of the sensor electrodes 120 for capacitive sensing during periods in which input sensing is desired. In one embodiment, the sensor module 204 is configured to drive a modulated signal onto the at least one sensor electrode to detect changes in absolute capacitance between the at least one sensor electrode and an input object. In another embodiment, the sensor module 204 is configured to drive a transmitter signal onto the at least one sensor electrode to detect changes in a transcapacitance between the at least one sensor electrode and another sensor electrode. The modulated and transmitter signals are generally varying voltage signals comprising a plurality of voltage transitions over a period of time allocated for input sensing. In various embodiments, the sensor electrodes 120 and/or grid electrode 122 may be driven differently in different modes of operation. In one embodiment, the sensor electrodes 120 and/or grid electrode 122 may be driven with signals (modulated signals, transmitter signals and/or shield signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, phase, amplitude, and phase. The sensor module 204 may be selectively coupled one or more of the sensor electrodes 120 and/or the grid electrode 122. For example, the sensor module 204 may be coupled selected portions of the sensor electrodes 120 and operate in either an absolute or transcapacitive sensing mode. In another example, the sensor module 204 may be a different portion of the sensor electrodes 120 and operate in either an absolute or transcapacitive sensing mode. In yet another example, the sensor module 204 may be coupled to all the sensor electrodes 120 and operate in either an absolute or transcapacitive sensing mode.

The sensor module 204 is configured to operate the grid electrode 122 as a shield electrode that may shield sensor electrodes 120 from the electrical effects of nearby conductors. In one embodiment, the processing system is configured to operate the grid electrode 122 as a shield electrode that may shield sensor electrodes 120 from the electrical effects of nearby conductors, and to guard the sensor electrodes 120 from grid electrode 122, at least partially reducing the parasitic capacitance between the grid electrode 122 and the sensor electrodes 120. In one embodiment, a shielding signal is driven onto the grid electrode 122. The shielding signal may be a ground signal, such as the system ground or other ground, or any other constant voltage (i.e., non-modulated) signal. In another embodiment, operating the grid electrode 122 as a shield electrode may comprise electrically floating the grid electrode. In embodiment, grid electrode 122 is able to operate as an effective shield electrode while being electrode floated due to its large coupling to the other sensor electrodes. In other embodiment, the shielding signal may be referred to as a guarding signal where the guarding signal is a varying voltage signal having at least one of a similar phase, frequency and amplitude as the modulated signal driven on to the sensor electrodes. In one or more embodiment, routing traces (e.g., routing traces 240 and/or 242) may be shielded from responding to an input object due to routing beneath the grid electrode 122 and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a long horizontal blanking period, long h-blanking period or a distributed blanking period, where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor module 204 and display module 208 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 204 includes circuitry configured to receive resulting signals with the sensing elements 124 comprising effects corresponding to the modulated signals or the transmitter signals during periods in which input sensing is desired. The sensor module 204 may determine a position of the input object 140 in the sensing region 170 or may provide a signal including information indicative of the resulting signal to another module or processor, for example, a determination module or a processor of the electronic device 150 (i.e., a host processor), for determining the position of the input object 140 in the sensing region 170.

The display driver module 208 may be included in or separate from the processing system 110. The display driver module 208 includes circuitry configured to provide display image update information to the display of the display device 160 during non-sensing (e.g., display updating) periods.

In one embodiment, the processing system 110 comprises a first integrated controller comprising the display driver module 208 and at least a portion of the sensor module 204 (i.e., transmitter module and/or receiver module). In another embodiment, the processing system 110 comprises a first integrated controller comprising the display driver module 208 and a second integrated controller comprising the sensor module 204. In yet another embodiment, the processing system comprises a first integrated controller comprising display driver module 208 and a first portion of the sensor module 204 (e.g., one of a transmitter module and a receiver module) and a second integrated controller comprising a second portion of the sensor module 204 (e.g., the other one of the transmitter and receiver modules). In those embodiments comprising multiple integrated circuits, a synchronization mechanism may be coupled between them, configured to synchronize display updating periods, sensing periods, transmitter signals, display update signals, and the like.

As discussed above, the sensor electrodes 120 of the sensing elements 124 may be formed as discrete geometric forms, polygons, bars, pads, lines or other shapes, which are ohmically isolated from one another. In various embodiments, ohmically isolated comprises passively isolated, where active switches may be configured to couple different sensor electrodes to the same signal during a period of time. The sensor electrodes 120 may be electrically coupled through circuitry to form electrodes of having larger plan area relative to a discrete one of the sensor electrodes 120. The sensor electrodes 120 may be fabricated from opaque or non-opaque conductive materials, or a combination of the two. In embodiments wherein the sensor electrodes 120 are utilized with a display device, it may be desirable to utilize non-opaque conductive materials for the sensor electrodes 120. In embodiments wherein the sensor electrodes 120 are not utilized with a display device, it may be desirable to utilize opaque conductive materials having lower resistivity for the sensor electrodes 120 to improve sensor performance. Materials suitable for fabricating the sensor electrodes 120 include indium tin oxide (ITO), aluminum, silver, copper, molybdenum, and conductive carbon materials, among others, and various sensor electrodes may be formed of a deposited stack of different conductive materials. The sensor electrodes 120 may be formed as contiguous body of conductive material having little or no open area (i.e., having a planar surface uninterrupted by holes), or may alternatively be fabricated to form a body of material having openings formed therethrough. For example, the sensor electrodes 120 may be formed from a mesh of conductive material, such as a plurality of interconnected thin metal wires. In one embodiment, at least one of the length and width of the sensor electrodes 120 may be in a range of about 1 to about 2 mm. In other embodiments, at least one of the length and width of the sensor electrodes may be less than about 1 mm or greater than about 2 mm. In other embodiment, the length and width may not be similar, and one of the length and width may be in the range of about 1 to about 2 mm. Further, in various embodiments, the sensor electrodes 120 may comprise a center-to-center pitch in the range of about 4 to about 5 mm; however, in other embodiments, the pitch may be less than about 4 mm or greater than about 5 mm.

The grid electrode 122 may be fabricated similar to the sensor electrodes 120. The sensor electrodes 120 and the grid electrode 122 may be coupled to the processing system 110 utilizing conductive routing traces 240, 242 (shown in phantom). The routing traces 240, 242 may be formed in the same plane with at least one of the sensor electrodes 120 and the grid electrode 122, or may be formed on one or more separate substrates and connected to the respective electrodes 120, 122 by conductive vias (not shown). Routing traces 240 and 242 may be formed on a metal layer disposed such that the sensor electrodes 120 are between the metal layer and the input object. In one embodiment the metal layer comprises source driver lines and/or gate lines for a display device. The conductive traces 240, 242 and vias connected therewith may be obscured from a user by a black mask layer disposed between the components and the user of the display device. At least one of the routing traces 240 and 242 may be included in the source driver metal layer. In one or more embodiments such a layer may be referred to as a metal interconnect layer two. Further, routing traces 240 and/or 242 may be disposed on a metal layer between source driver lines. Alternately, at least one of the routing traces 240 and 242 may comprise one or more conductors in the gate driver metal layer, or gate driver lines that are not configured for display updating. Further, routing traces 240 and/or 242 may be disposed on a metal layer between gate driver lines. In another embodiment, at least one of the routing traces 240 and 242 may comprise one or more conductors in the Vcom jumper metal layer, or Vcom lines not otherwise configured for display updating. Further, routing traces 240 and/or 242 may be disposed on a metal layer between gate electrodes. In other embodiments, the metal layer is included in addition to a layer comprising the source driver lines and/or gate lines. A portion of the routing traces 140, 142 may also be formed laterally outward of the areal bounds of the sensing elements 124. In various embodiments, the routing traces 240 and/or 242 may be disposed in a Vcom electrode jumper layer. The Vcom electrode jumper layer may be referred to as metal layer three or a metal interconnect layer three. In one embodiment, conductive traces may be disposed on both a source drive layer and a Vcom electrode jumper layer. In various embodiments, the display device may comprise a "dual gate" or "half source driver" configuration, allowing routing traces 240 and/or 242 to be disposed between source drivers on the source driver layer. In one or more embodiments, connections formed between the routing traces 240 and 242 and the various conductors used for display updating have an orthogonal direction to the lengths of the routing traces and/or conductors. For example, each may be disposed on separate layers, with vias between them.

The grid electrode 122 is disposed between at least two of the sensor electrodes 120. The grid electrode 122 may at least partially circumscribe the plurality of sensor electrodes 120 as a group, and may also, or in the alternative, completely or partially circumscribe one or more of the sensor electrodes 120. In one embodiment, the grid electrode 122 is a planar body 212 having a plurality of apertures 210, each aperture 210 circumscribing a respective one of the sensor electrodes 120. Accordingly, the grid electrode 122 separates and circumscribes at least 3 or more of sensor electrodes 120, and in this example, separates and circumscribes all of sensor electrodes 120. The gap 202 spaces the body 212 from the sensor electrode 120 disposed in the aperture 210. In one or more embodiments, the grid electrode 122 is configured to substantially fill the space defined by the gap 202. In one embodiment, a second grid electrode may be disposed on a substrate between grid electrode 122 and a touch input layer. The second grid electrode may be the same size as grid electrode 122, or larger than grid electrode 122 such that it overlaps one more sensor electrodes 120 and grid electrode 122, or smaller than grid electrode 122 such that it overlaps a portion of the grid electrode 122. In various embodiments, the grid electrode 122 is disposed between at least two of the sensor electrodes 120 such that the grid electrode 122 is on a different layer (i.e., different substrate, or different side of the same substrate) and overlaps a portion of at least two sensor electrodes and the gap between the sensor electrodes. In the embodiments where the sensor electrodes 120 comprise one or more common electrodes, the sensor electrodes may comprise the entirety of the common electrode layer.

The grid electrode 122 may also be segmented. The segmentation of the grid electrode 122 may allow segments of the grid electrode 122 be less visible. The segments may interconnect using traces or vias, so that the all the segments of the grid electrode 122 may be driven simultaneously with a common signal. Alternatively, one or more of the segments of the grid electrode 122 may be driven independently to facilitate scanning of the sensor electrodes 120 when configured as receiver electrodes in certain modes of operation as discussed further below.

As shown in the enlargement of FIG. 2, the grid electrode 122 may include a first segment 230, a second segment 232 and a third segment 234. The first and second segments 230, 232 are offset from each other and sandwich a column of sensor electrodes, shown as sensor electrodes $120_{3,1}$, $120_{3,2}$. Although not shown in the enlargement, the first segment 230 also separates the column of sensor electrodes $120_{3,1-Y}$ from sensor electrodes $120_{2,1-Y}$ while the second segment 232 separates the column of sensor electrodes $120_{3,1-Y}$ from an adjacent column of sensor electrodes 120. The third segment 234 is disposed between neighboring sensor electrodes 120 within one column, shown as sensor electrodes $120_{3,1}$, $120_{3,2}$. In some embodiments, two or more of the segments 230, 232, 234 may be independently driven, for example as transmitter electrodes.

In one embodiment, segments of the grid electrode 122 may each entirely circumscribe a plurality of sensor electrodes 120 in one or more rows and/or one or more columns. For example, a first segment of grid electrode 122 could entirely circumscribe sensor electrodes $120_{1,1}$, $120_{2,1}$, $120_{1,2}$, and $120_{2,2}$. A second segment of grid electrode 122 adjacent to the first segment could entirely circumscribe at least sensor electrodes $120_{1,3}$, and $120_{2,3}$ (e.g., could also include one or more sensor electrodes 120 not depicted). Similarly, a third segment of grid electrode 122 adjacent to the first segment could entirely circumscribe at least sensor electrodes $120_{3,1}$, and $120_{3,2}$ and could also include one or more sensor electrodes 120 not depicted.

Figure 3:
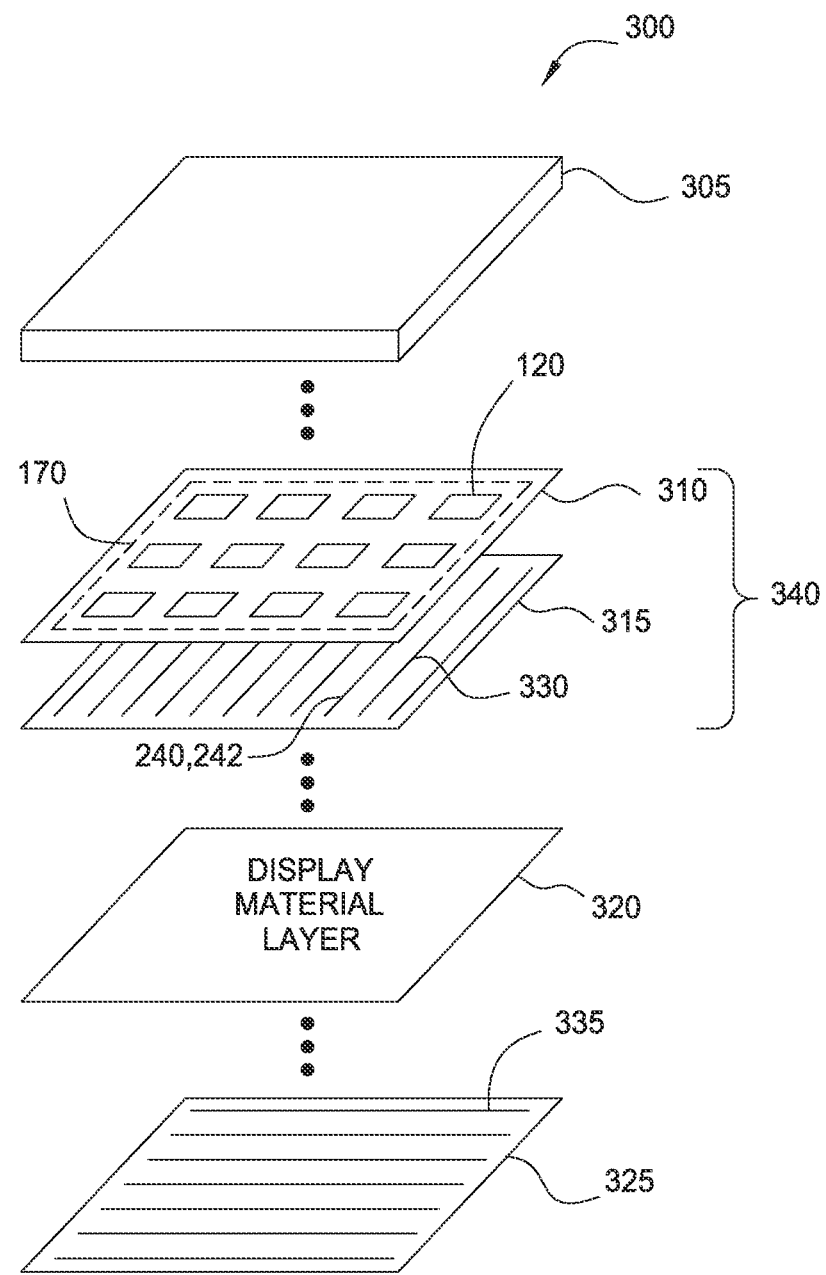
FIG. 3 illustrates a display panel including an integrated input device having a pattern of capacitive sensing elements, according to one embodiment.

FIG. 3 illustrates a display panel 300 including an integrated input device 100 having a pattern of capacitive sensing elements, according to one embodiment described herein. Panel 300 includes a glass layer 305 which may serve as an outer layer of the panel 300. Although this layer 305 is specifically disclosed as glass, layer 305 may include any suitable transparent material—e.g., a plastic or polymer. In one embodiment, glass layer 305 may be a protective upper layer of the panel 300. Although not shown, additional layers may be added onto the glass layer 305 when manufacturing a display device.

Layer 310 includes transparent sensor electrodes 120 which may define the sensing region 170. Layer 310 may further include grid electrode(s) 122, which are not depicted here for visual clarity. As such, the capacitive sensing elements used to detect the proximity of an input object relative to the display panel 300 may be integrated within the display panel instead of, for example, being laminated on top of the panel 300—e.g., fabricated on the upper surface of glass layer 305. Layer 310 may be directly beneath the glass layer 305 or one or more layers may separate the layers 305 and 310 within the display panel 300.

In one embodiment, layer 310 may be used when updating the display and when performing capacitive sensing—i.e., the sensor electrodes 120 comprise common electrodes, as described above. In one embodiment, the sensor electrodes 120 include all the common electrodes in the layer 310. During display updating, the sensor electrodes 120 may be coupled with the display pixels (or, more specifically, sub-pixels of the display pixels) to serve as the reference voltage (e.g., ground or Vcom) when setting the voltage across the sub-pixels. During capacitive sensing, however, the capacitive sensing signals may be driven onto the sensor electrodes 120 in order to detect input objects. In one embodiment, layer 310 may be a Vcom layer that is patterned into the sensor electrodes 120 in order to serve the dual purposes described above. In other embodiments, the sensor electrodes 120 may be integrated into other layers of the display panel 300, e.g., such as the layer that forms the gate electrodes. Thus, in order to integrate the sensor electrodes 120 into a display panel 300, additional thickness is not added to the panel 300 relative to a display panel that does not contain capacitive sensing elements.

Display panel 300 includes a source line layer 315 which routes the various source lines 330 for driving voltages onto the display pixels of the panel 300. As shown, layer 315 also includes routing traces 240, 242, which may be interleaved or otherwise suitably arranged relative to the source lines 330. Although not shown, display panel 300 may include a number of conductive vias that couple the routing traces 240, 242 on layer 315 to one or more of the sensor electrodes 120 (and/or grid electrode(s) 122) of layer 310. Although FIG. 3 depicts source line layer 315 as directly contacting layer 310, this is not a requirement. For example, the vias may extend through multiple layers in order to electrically connect the routing traces 240, 242 with the sensor electrodes 120.

In some embodiments, layers 310 and 330 are included in an assembly 340. The assembly 340 further includes the plurality of conductive vias (not shown) coupling the sensor electrodes 120 (and/or grid electrode(s) 122) of layer 310 with the routing traces 240, 242 on the source line layer 315. The assembly 340 may correspond to an intermediate stage of the manufacturing process of display panel 300 and/or to a portion of the display panel 300 when manufactured. The assembly 340 is configured to couple with a processing system through routing traces 240, 242 to operate the sensor electrodes 120 and/or grid electrode(s) 122. The assembly 340 may therefore be operable using a number of different processing systems. In some embodiments, the assembly 340 may include one or more additional layers, may have a different ordering of the layers, and so forth.

Display material layer 320 may include display pixels. That is, the material used to form the display pixels (e.g., liquid crystal, emissive electroluminescent material, etc.) may be placed on layer 320. As such, the panel 300 may include vias that couple the pixels in layer 320 with the source lines 330 in layer 315.

Display panel 300 may include a gate line layer 325 which includes a plurality of gate lines 335 operable to electrically couple the source lines 330 with the pixels in the display material layer 320. As such, panel 300 may include vias that couple the gate lines 335 to switching elements (not shown) in the display material layer 320. Moreover, the layers depicted in FIG. 3, as well as their relative ordering, are for illustration purposes only, and are not intended to limit the different display panels which may be used consistent with the embodiments presented herein. For example, the display panel 300 may include more or less layers than the layers shown, the display panel 300 may order the layers differently, etc.

Figure 4:
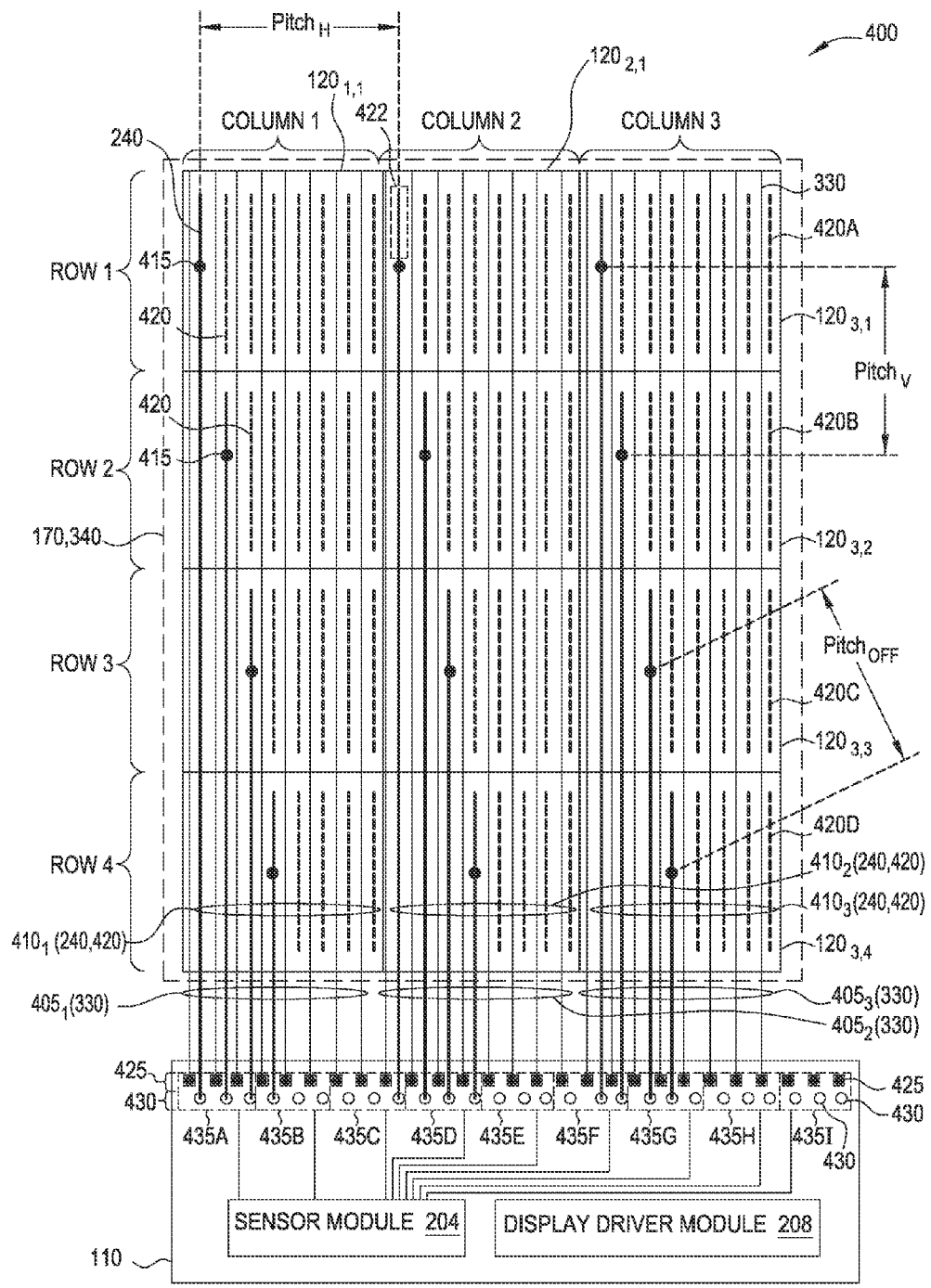
FIG. 4 illustrates an exemplary arrangement of vias in a regular pattern, according to one embodiment.

FIG. 4 illustrates an exemplary arrangement of vias in a regular pattern, according to one embodiment. The vias 415 are used to electrically couple different layers of an assembly 340, which as discussed above may be included as part of a display panel and/or an input device. More specifically, FIG. 4 shows a transparent, top-down schematic view of an arrangement 400 of the assembly 340 coupled with a processing system 110.

In arrangement 400, the sensor electrodes 120 ($120_{1,1}$ to $120_{3,4}$) are arranged in a matrix having three (3) columns and four (4) rows. Each column of sensor electrodes 120 corresponds to a number of routing traces 240 and a number of source lines 330. As shown, each column of sensor electrodes 120 (e.g., Columns 1, 2, 3) corresponds to a particular display column $405_1$, $405_2$, $405_3$ having eight (8) source lines 330. Each column of sensor electrodes 120 also corresponds to a particular sensing column $410_1$, $410_2$, $410_3$ (individually or collectively, columns 410) having up to eight (8) routing traces 240. The numbers of source lines 330 and routing traces 240 may vary, and may also vary from each other. The sensing region 170 is defined proximate to the plurality of sensor electrodes 120. The source lines 330 and routing traces 240 are disposed in an alternating pattern and in parallel with each other, which can provide improved consistency of the sensing within the sensing region 170, but this is not a requirement. Additionally, in this arrangement 400, the source lines 330 and routing traces 240 do not need to cross to couple with the processing system 110, so that both may be disposed within the same layer without requiring any further processing.

Vias 415 connect the sensor electrodes 120 disposed on a first layer with the routing traces 240 disposed on a second layer. In various embodiments described herein, the vias 415 are arranged in regular pattern within an areal extent of the sensing region 170. As discussed herein, a regular pattern includes a plurality of vias disposed with a same pitch along one or more dimensions (i.e., providing equal spacing for neighboring via locations). Some examples of via pitch include pitch relative to a horizontal dimension (e.g., $Pitch_H$), pitch relative to a vertical dimension (e.g., $Pitch_V$), and pitch relative to one or more off-axis dimensions (e.g., $Pitch_{OFF}$). Off-axis dimensions may be defined relative to any desired orientation from a reference dimension, such as "horizontal," "vertical," or any alternative predefined axis. For example, PitchOFF could correspond to a certain angle, such as 35° above horizontal.

In one embodiment, the regular pattern of vias 415 corresponds to a same pitch along a single dimension. In other embodiments, the regular pattern includes vias having a same pitch along two or more dimensions. For example, the pattern of vias 415 in arrangement 400 has a same respective pitch in each of the horizontal, vertical, and off-axis dimensions. While it is possible that $Pitch_H$ equals $Pitch_V$ equals $Pitch_{OFF}$, this is not a requirement.

The regular pattern of vias 415 in some cases may correspond to the arrangement of the sensor electrodes 120 connected with the vias. For example, the sensor electrodes 120 included in a particular row (e.g., sensor electrodes $120_{1,1}$, $120_{2,1}$, $120_{3,1}$ of Row 1) each have a corresponding via 415 that is disposed in a same location relative to the respective sensor electrode 120. Although a single via 415 is displayed per sensor electrode 120, embodiments may include sensor electrodes 120 that are each connected with multiple vias, so long as the resulting via pattern is regular. While the array of sensor electrodes 120 depicted in arrangement 400 represents a rectangular (Cartesian) arrangement of rows and columns, the regular pattern of vias 415 may be implemented using different arrangements of the sensor electrodes 120. The sensor electrodes 120 may have alternative shape(s) (such as hexagonal, or any other suitable regular or non-regular shape), and the sensor electrodes 120 may be arranged based on the alternate shape(s) (e.g., a hexagonal array).

While the regular pattern of vias 415 in arrangement 400 are depicted as being regularly spaced throughout the areal extent of sensing region 170, in other embodiments the regular patterns may include groups of vias 415 having a regular spacing within the groups (say, one or more intra-group pitch values) and having a regular spacing between the groups (say, one or more inter-group pitch values).

A regular pattern of vias 415 provides a number of benefits during the manufacturing of the assembly and/or the operation of the manufactured assembly. In some cases, the regular pattern of vias permits a simpler process of visual inspection of the assembly during production, as a camera or other visual sensing device may have a reduced number of changes to orientation, position, etc. to detect all of the vias 415 of assembly 340. In some cases, the regular pattern of vias 415 increases the uniformity of the assembly, which can increase the reliability of its operation. In some cases the regular pattern of vias 415 can reduce the number of lines or traces formed or otherwise included in the assembly 340. In these cases, the lines or traces can be cut or otherwise segmented to provide desired via connections with the sensor electrodes 120. Such a feature permits the assembly 340 to be customized for use with a particular processing system. For example, multiplexing capabilities of different processing systems may vary, so that the traces of the assembly 340 may be cut differently in order to connect with the target processing system. The desired connections of the processing system 110 with sensor electrodes 120 may be formed by cutting or segmenting the lines.

Each source line 330 is connected with the processing system 110 at a corresponding pad 425. Similarly, each of the routing traces 240 is connected with the processing system 110 at a corresponding pad 430. Each pad 425, 430 generally represents a conductive connection with a distinct pin or terminal of the sensor module 204 or display driver module 208. The pads 425, 430 may be arranged in a plurality of groups 435A-435I (collectively or individually, groups 435). The processing system 110 may operate the sensor electrodes 120 according to the groups 435. For example, the sensor module 204 of the processing system includes a limited number of analog to digital converters (ADCs) for measuring the input provided at the sensor electrodes 120. To save space and/or decrease the power consumption of the processing system 110, the sensor module 204 may include fewer ADCs than the number of pads 430, and may further include logic (such as multiplexer circuitry) to connect selected ones of the pads 430 with a corresponding ADC for sampling. As shown, each group 435A-435I corresponds to three (3) different pads 430. In some embodiments, the groups 435 may allow the processing system 110 to sense with a desired sensing shape (such as contemporaneous sensing on a plurality of adjacent rows), which can help detect and filter noise during sensing.

The pads 425, 430 are arranged in the processing system 110 such that the routing traces 240 and source lines 330 are substantially parallel with each other. As shown, the pads 425 are disposed in a first row and parallel to a second row of the pads 430, with the pads 425, 430 interleaved (or alternating) along the length of the rows. Moreover, the routing traces 240 and sources lines 330 need not cross over each other in this example. As will be seen in further examples, however, and depending on the composition and layout of the groups 435, it may be challenging to acquire a desired sampling shape. For example, it can be beneficial to couple those routing traces 240 corresponding to each sensing column 410 in a consistent pattern with the groups 435, but the groups 435 may not be completely aligned with the columns 410. As shown, a left-most routing trace 240 of sensing column 405$_1$ (and connected to a via 415 in Row 1) is connected with a left-most pad 430 of group 435A, but the left-most routing trace 240 of column 405$_2$ (also connected at Row 1) is connected with a right-most pad 430 of group 435C, and the left-most routing trace 240 of column 405$_3$ (also connected at Row 1) is connected with a middle pad 430 of group 435F. These routing traces 240, though connected with the same row of sensor electrodes 120, are not similarly aligned relative to the respective groups 435. In some cases, the processing system 110 may be unable to sense with a desired shape (say, all sensor electrodes 120 of Row 1 sampled contemporaneously) because of the different alignment.

In some embodiments, the assembly 340 includes one or more dummy traces 420. The dummy traces 420 may be disposed in the same layer as the routing traces 240 and/or the source lines 330. The dummy traces 420 are disposed substantially parallel to the routing traces 240 and/or the source lines 330. Though not shown here, the dummy traces 420 may also be connected with one or more dummy vias that are included in the regular pattern of vias. The dummy traces 420 may be formed similarly to the routing traces 240, or may be formed differently. In some embodiments, the dummy traces 420 have the same physical properties (materials, dimensions) as routing traces 240 but are cut, segmented, or otherwise not connected with the processing system 110. In some cases, the dimensions of the segments or locations of the cuts of the dummy traces 420 can be selected to improve signal settling time on the routing traces 240. For example, the dummy traces 420 may be segmented to reduce a resistance of the dummy traces 420, and/or to reduce a capacitance of the dummy traces 420 with the routing traces 240.

As shown, four segments of a particular dummy trace (420A-420D) are shown, with each segment overlapping with a single sensor electrode 120. In other embodiments, the dummy traces 420 may extend across multiple sensor electrodes 120. In some embodiments, a dummy trace 420 having one or more segments may be disposed inline with a routing trace 240. In one embodiment, a segment of an inline dummy trace 420 may overlap with the same sensor electrode 120 as the corresponding routing trace 240, such as within an area 422. In one embodiment, an inline dummy trace 420 is disposed over different sensor electrode(s) 120 than the corresponding routing trace 240.

Figure 5:
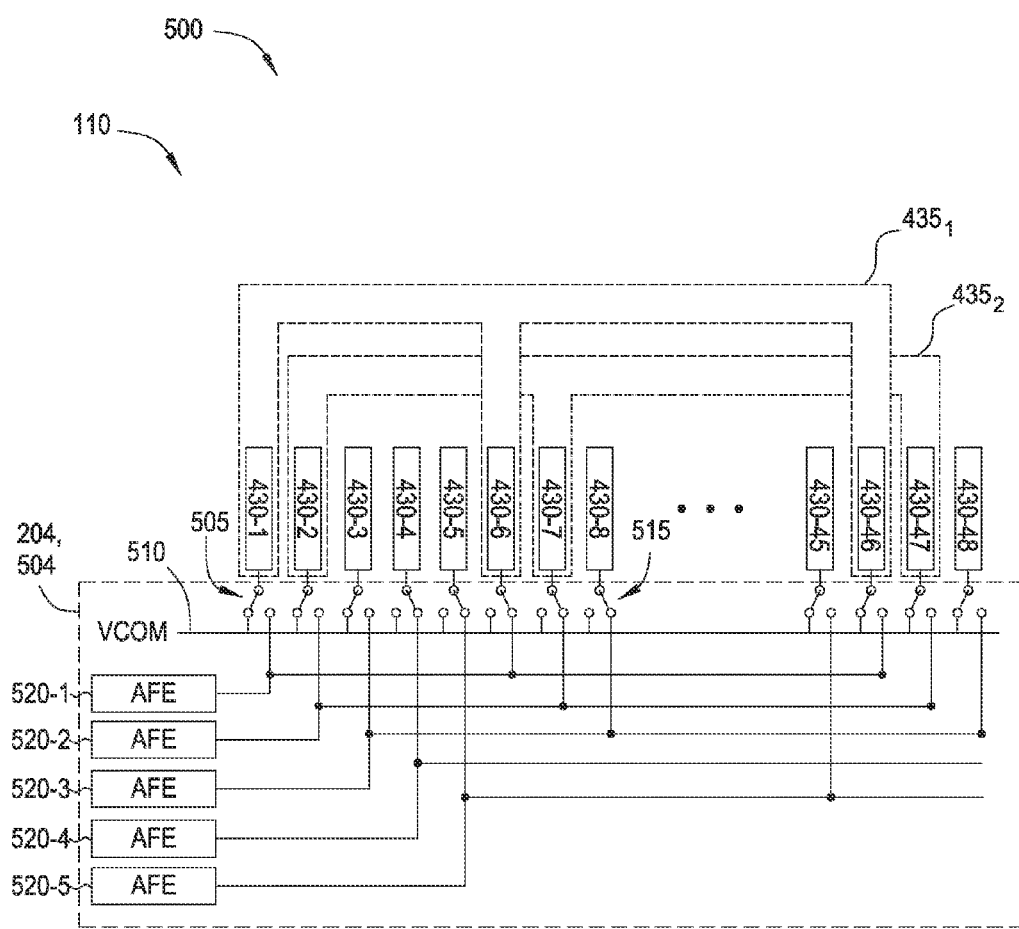
FIG. 5 illustrates interleaved groups of pads within an exemplary processing system, according to one embodiment.

FIG. 5 illustrates interleaved groups of pads within an exemplary processing system, according to one embodiment. Specifically, processing system 500 represents one possible implementation of the processing system 110. The processing system 500 includes a plurality of pads 430-1 to 430-48 (collectively or generically, pad(s) 430) that are configured to connect with corresponding routing traces 240 (not shown). Each of the pads 430 is coupled with sensor module 504, which represents one possible implementation of the sensor module 204 discussed above. Within the sensor module 504, each pad 430 is connected with a switching device that operates to selectively couple the pad 430 with a common (VCOM) electrode 510 in a first state 505, and with a respective analog front-end (AFE) 520-1 to 520-5 of the processing system 500 in a second state 515. The AFEs 520-1 to 520-5 generally include signal conditioning circuitry, analog-to-digital converter circuitry, sampling circuitry, etc. used for making sensing measurements to determine the presence and/or location of input objects. Each of the AFEs 520-1 to 520-5 is configured to connect with a plurality of the pads 430 according to an interleaved group 435$_1$, 435$_2$, etc. For example, group 435$_1$ corresponds to pads 430-1, 430-6, 430-11 (not shown), . . . , and 430-46. Group 435$_2$ corresponds to pads 430-2, 430-7, 430-12 (not shown), . . . , and 430-47. The AFEs 520-1 to 520-5 each include conductive connections with the switching devices for the pads 430 of the corresponding group 435.

During operation of the processing system 500, a number of consecutive pads 430 may be sampled contemporaneously (that is, pads 430 connected with AFEs 520-1 to 520-5 to receive data from corresponding sensor electrodes). As will be seen in FIG. 6, the consecutive pads 430 can correspond to consecutive rows of sensor electrodes 120 (not shown). The number of pads 430 that can be sampled contemporaneously may be limited by the number of AFEs included in the processing system 500 (here, up to five pads 430 can be sampled contemporaneously).

In some embodiments, processing system 500 may sample each of the pads 430 in a scan pattern. For example, at a first time, pads 430-1 to 430-5 are coupled with respective AFEs 520-1 to 520-5 (that is, their corresponding switching devices are in the second state 515), while the remaining pads 430-6 to 430-48 are connected with the common electrode 510 (having switching devices in the first state 505). The sensor electrodes connected with pads 430-1 to 430-5 may be sampled. At a second time, the switch for pad 430-1 transitions into the first state 505, and the switch for pad 430-6 transitions into the second state 510. The sensor electrodes connected with pads 430-2 to 430-6 may be sampled. At another time, and as illustrated in FIG. 5, pads 430-1 to 430-3 are coupled with the common electrode 510, while pads 430-4 to 430-8 are coupled with the AFEs 520-1 to 520-5. The scan may continue in this incremental fashion until all of the pads 430 have been sampled at least once.

In other embodiments, the sampling pattern can differ from the "left-to-right" scan pattern described. In some cases, the sampling pattern could occur in the reverse direction. In some cases, the sampling pattern samples on varying numbers of consecutive pads 430. Using an example of a left-to-right pattern, the last few sample times might include pads 430-44 to 430-48 (five pads), then 430-45 to 430-48 (four pads), 430-46 to 430-48 (three pads), and so forth. In some cases, the sampling pattern samples consecutive pads 430 in a different sequence (e.g., pads 430-1 to 430-5 at one sampling time, 430-6 to 430-10 at the next sampling time, etc.). In some cases, the sampling pattern of consecutive pads may have a non-regular sequence.

Figure 6:
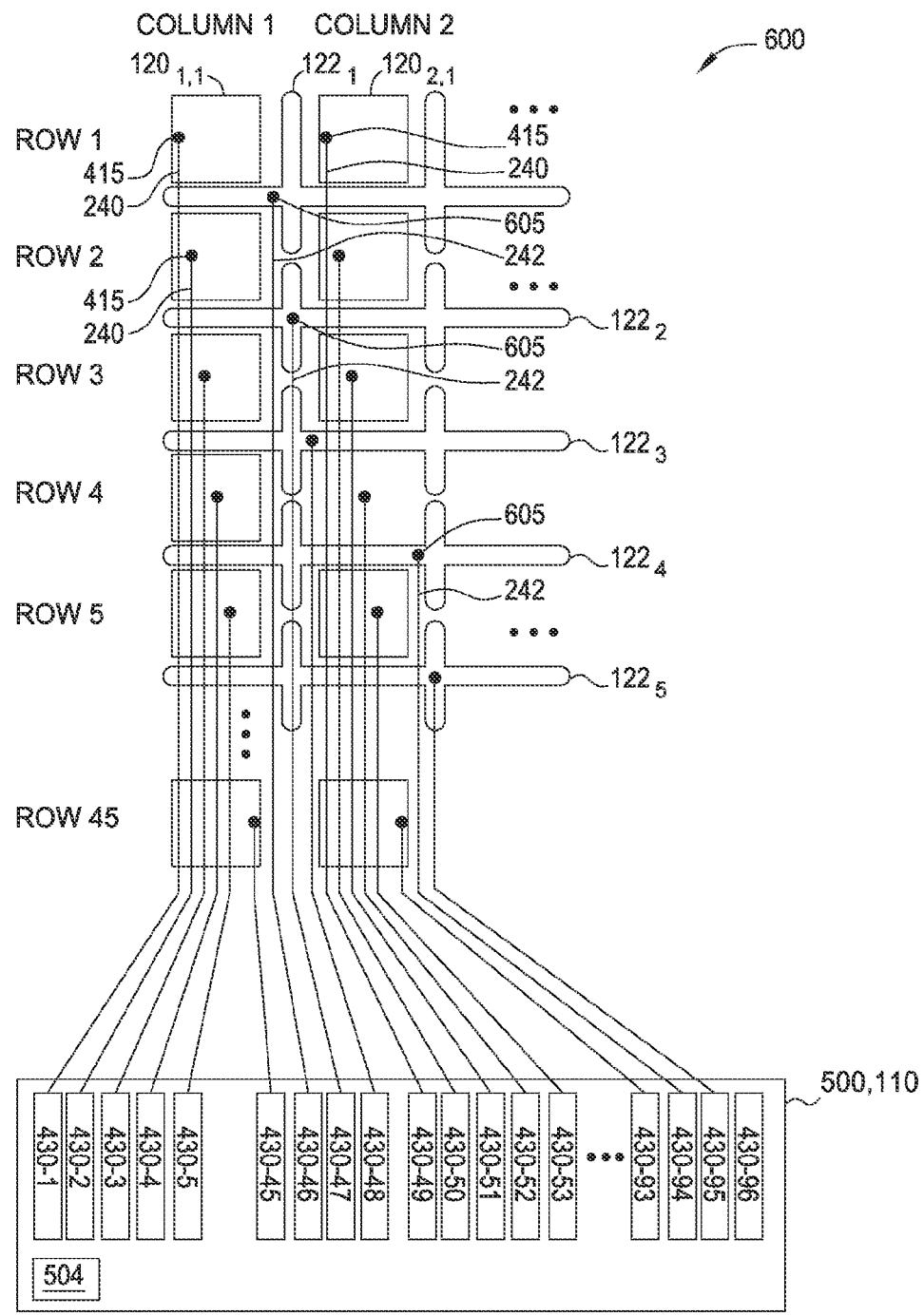
FIG. 6 illustrates an exemplary arrangement of vias in a regular pattern according to the interleaved groups of pads illustrated in FIG. 5, according to one embodiment.

FIG. 6 illustrates an exemplary arrangement of vias in a regular pattern according to the interleaved groups of pads illustrated in FIG. 5, according to one embodiment. FIG. 6 shows a top-down schematic view of an arrangement 600 coupled with a processing system 500. For simplicity and clarity, the source lines 330 with corresponding pads 425 are not illustrated. As shown, the vias 415 may be arranged in a relatively simple diagonal pattern within each column (columns 1, 2) while still allowing several rows of sensor electrodes 120 to be sampled contemporaneously. Using the example of sensor module 504, which includes five AFEs, the processing system 500 can sample on as many as five consecutive rows of sensor electrodes 120.

Arrangement 600 also includes a plurality of vias 605 for connecting routing traces 242 with grid electrodes 122$_1$-122$_5$. In some embodiments, the vias 415 are arranged in one regular pattern, while the vias 605 are arranged in another regular pattern. For example, and as shown, the vias 605 connected with grid electrodes 122$_1$-122$_3$ are disposed in a diagonal pattern between the sensor electrodes 120 of Column 1 and Column 2. The vias 605 connected with grid electrodes 122$_4$, 122$_5$, and 122$_6$ (not shown) are disposed in a similar diagonal pattern between sensor electrodes 120 of Column 2 and the next adjacent column. The pattern of vias 605—here, three vias 605 connected to corresponding grid electrodes 122 between each column of sensor electrodes—may continue across all 45 rows of sensor electrodes 120. The pattern of vias 605 may repeat after reaching the last row and/or grid electrode. For example, continuing the depicted pattern, vias 605 could connect to grid electrodes 122$_{43}$, 122$_{44}$, and 122$_{45}$ between columns 15 and 16 of sensor electrodes 120. Then, the pattern of vias 605 may repeat, with the vias 605 disposed between columns 16 and 17 connecting to grid electrodes 122$_1$-122$_3$ similar to the vias 605 depicted between columns 1 and 2, and so forth. Other regular patterns for vias 605 are possible. Thus, the vias 415 of arrangement 600 form a first pattern that is essentially repeated within each column of sensor electrodes 120, while the vias 605 form a second pattern different from the first pattern and that repeats after several columns of sensor electrodes 120. In another embodiment, however, the vias 415, 605 can be arranged together in a single regular pattern.

The arrangement 600 benefits from the use of interleaved groups of pads 430. With the interleaved groups, the pattern of vias 415 may be repeated within each column of sensor electrodes 120. Repeating the same pattern on each column reduces the complexity of visual inspection of the vias 415, and may further enhance regularity of the processing system 500 during operation. In some cases, interleaved groups can be used to reduce a number of dummy vias and dummy traces used in a particular implementation. In some cases, the interleaved groups support an implementation where no dummy vias and dummy traces are included at all.

Figure 7:
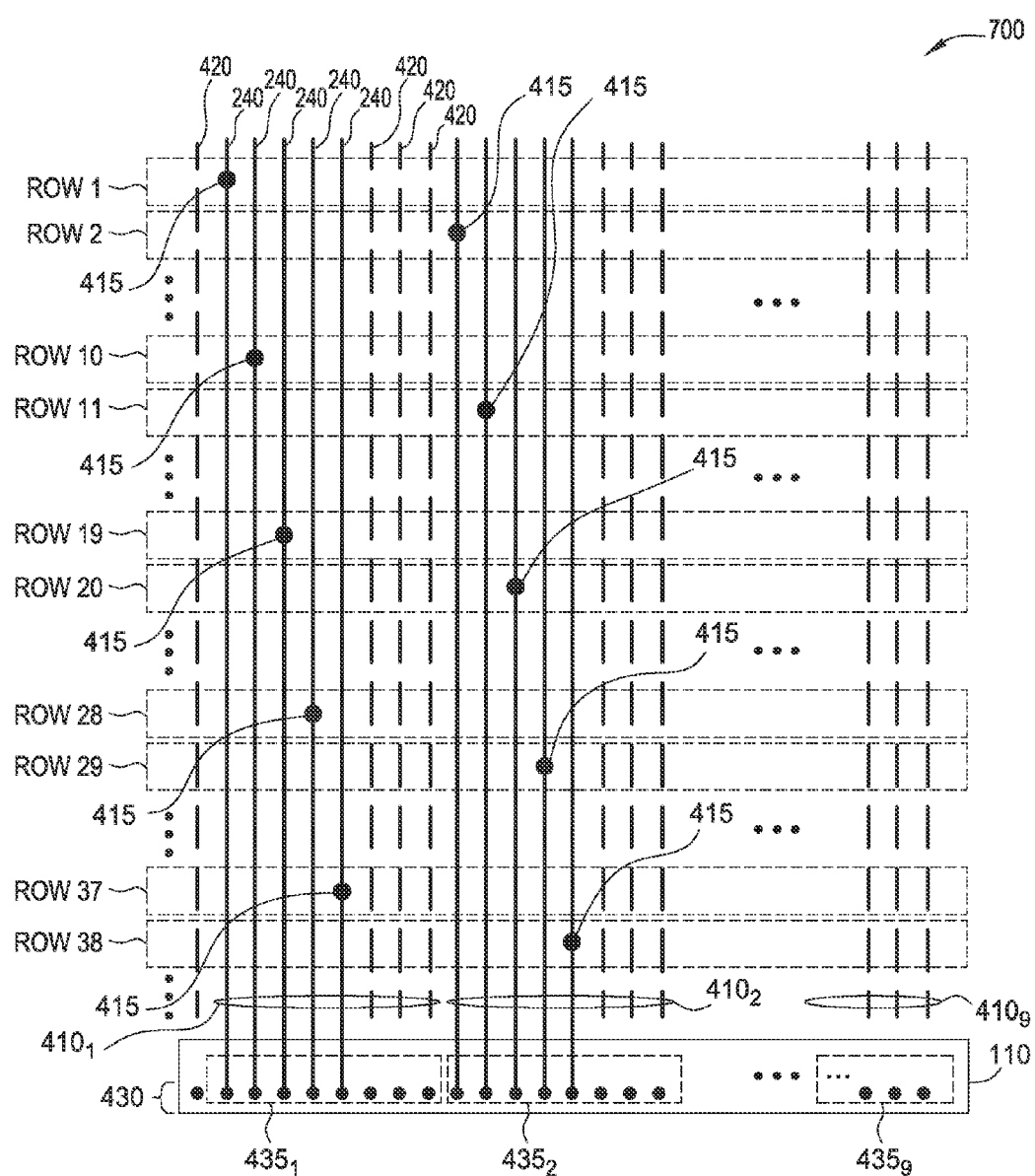
FIGS. 7 and 8 each illustrate an exemplary arrangement of vias in a regular pattern and supporting sensing on multiple adjacent rows of sensor electrodes, according to one embodiment.
Figure 8:
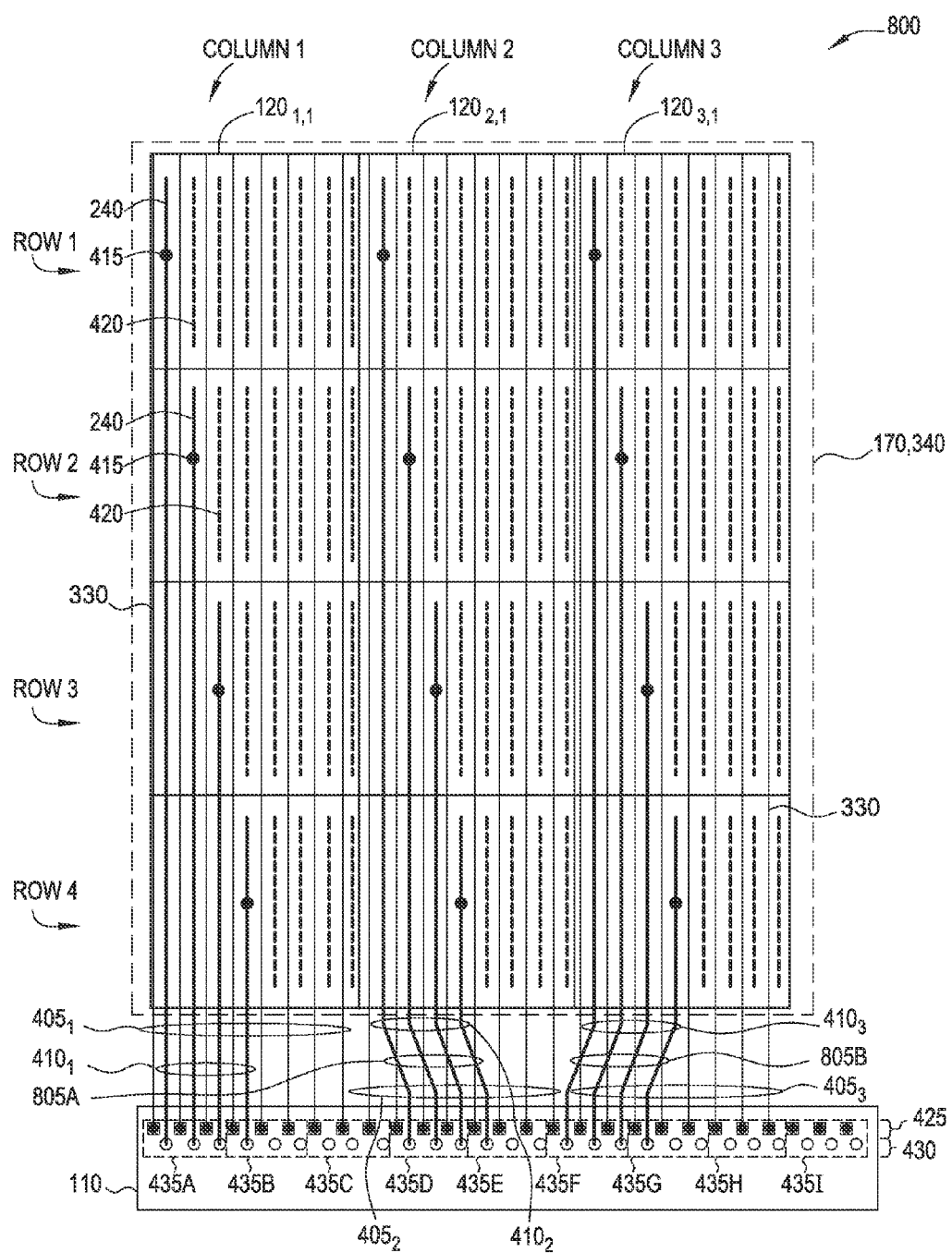

FIGS. 7 and 8 each illustrate an exemplary arrangement of vias in a regular pattern and supporting sensing on multiple adjacent rows of sensor electrodes, according to one embodiment. As discussed above, contemporaneous sensing with adjacent rows may be a desired sensing pattern for detecting and filtering noise during sensing.

FIG. 7 shows a top-down schematic view of an arrangement 700 coupled with a processing system 110. For simplicity and clarity, the source lines 330 and corresponding pads 425 are not illustrated. The arrangement 700 includes a plurality of rows, each row corresponding to one or more sensor electrodes 120. For example, the arrangement 700 corresponds to forty-five (45) different rows of sensor electrodes 120 and nine (9) groups 435, though other numbers of rows and groups are possible. The processing system 110 includes larger groups 435$_1$, 435$_2$, . . . , 435$_n$ that each correspond to eight (8) pads 430. Here, each group 435 of pads 430 corresponds to a sensing column 410$_1$, 410$_2$ comprising one or more routing traces 240 and one or more dummy traces 420. In some embodiments, the sensing columns 410$_1$, 410$_2$ each correspond to a column of sensor electrodes 120. In some cases, the sensing columns 410$_1$, 410$_2$ may further correspond to one or more grid electrodes. The dummy traces 420 may be continuous or segmented, as described above. Vias 415 connect sensor electrodes of certain rows with the processing system 110.

As illustrated in FIG. 7, the pattern of vias 415 within arrangement 700 may be regular while supporting contemporaneous sensing on multiple rows. For example, if each of groups $435_{1-9}$ are connected with a respective ADC—say, the routing traces 240 of each group 435 are connected to the respective ADC through corresponding multiplexing circuitry—the processing system 110 at a first time may contemporaneously acquire sensing information on Row 1 using group $435_1$, on Row 2 using group $435_2$, and so forth, to Row 9 using group $435_9$. The processing system 110 may similarly acquire sensing information on Rows 10-18 at a second time, Rows 19-27 at a third time, Rows 28-36 at a fourth time, and Rows 37-45 at a fifth time. The first through fifth times may occur in any desired order, whether sequentially or not. Further, although the arrangement 700 supports sampling on up to nine rows simultaneously, the processing system 110 may sample on fewer than all nine rows in some cases.

FIG. 8 shows a top-down schematic view of an arrangement 800 coupled with a processing system 110. The arrangement 800 generally is structured similarly to arrangement 400, except that certain of the routing traces 240 are routed across certain source lines 330.

In arrangement 800, the routing traces 240 of one or more sensing columns 410 (e.g., $410_1$) may align with the pads 430 of processing system 110 such that the routing traces 240 do not need to be routed across the source lines 330 of the corresponding display column (e.g., $405_1$). For example, the routing traces 240 of the sensing columns 410 may have a preferred alignment relative to the groups 435 (e.g., aligned such that a left-most routing trace 240 corresponds to a left-most pad 430 of a group 435). In another example, there might not be a preferred alignment for connection with the processing system 110, but one sensing column 410 is designated as a reference for the other sensing columns 410. In other words, the routing traces 240 of the other sensing columns 410 are connected with the processing system 110 based on the relative alignment of the reference sensing column 410 with groups 435.

In order to provide a desired alignment of one or more other sensing columns 410 (e.g., $410_2$, $410_3$) relative to the groups 435 of processing system 110, the corresponding routing traces 240 of the other sensing columns 410 may cross source lines 330 of the corresponding display column (e.g., $405_2$, $405_3$) within overlap areas 805A, 805B. For example, the left-most routing trace 240 of sensing column $410_2$ crosses a source line 330 at overlap area 805A to connect with a left-most pad 430 of group 435D. Likewise, the left-most routing trace 240 of sensing column $410_3$ crosses a source line 330 at overlap area 805B to connect with a left-most pad 430 of group 435F.

In one embodiment, the routing traces 240 are disposed on a different layer than the source lines 330 and separated by insulative material or air, so that the routing traces 240 and source lines 330 are not shorted together at the overlap areas 805A, 805B. In another embodiment, the routing traces 240 and source lines 330 may be included on the same layer and are shorted together at the overlap areas 805A. In such an embodiment, the processing system 110 may operate the sensor electrodes 120 and drive the source lines 330 in a manner suitable to perform the display updating and sensing functionalities. For example, the processing system 110 might perform display updating and sensing during non-overlapping time periods or using signals at sufficiently distinguishable frequencies. The processing system 110 may also compensate for the effects of display updating on sensing, and vice versa. For example, the processing system 110 could periodically drive or short source lines 330 or routing traces 240 to a reference or other predetermined voltage to mitigate charge coupling caused by display updating or sensing, could perform calculations on the sensing input to remove the electrical effects caused by display updating, and so forth.

Figure 9:
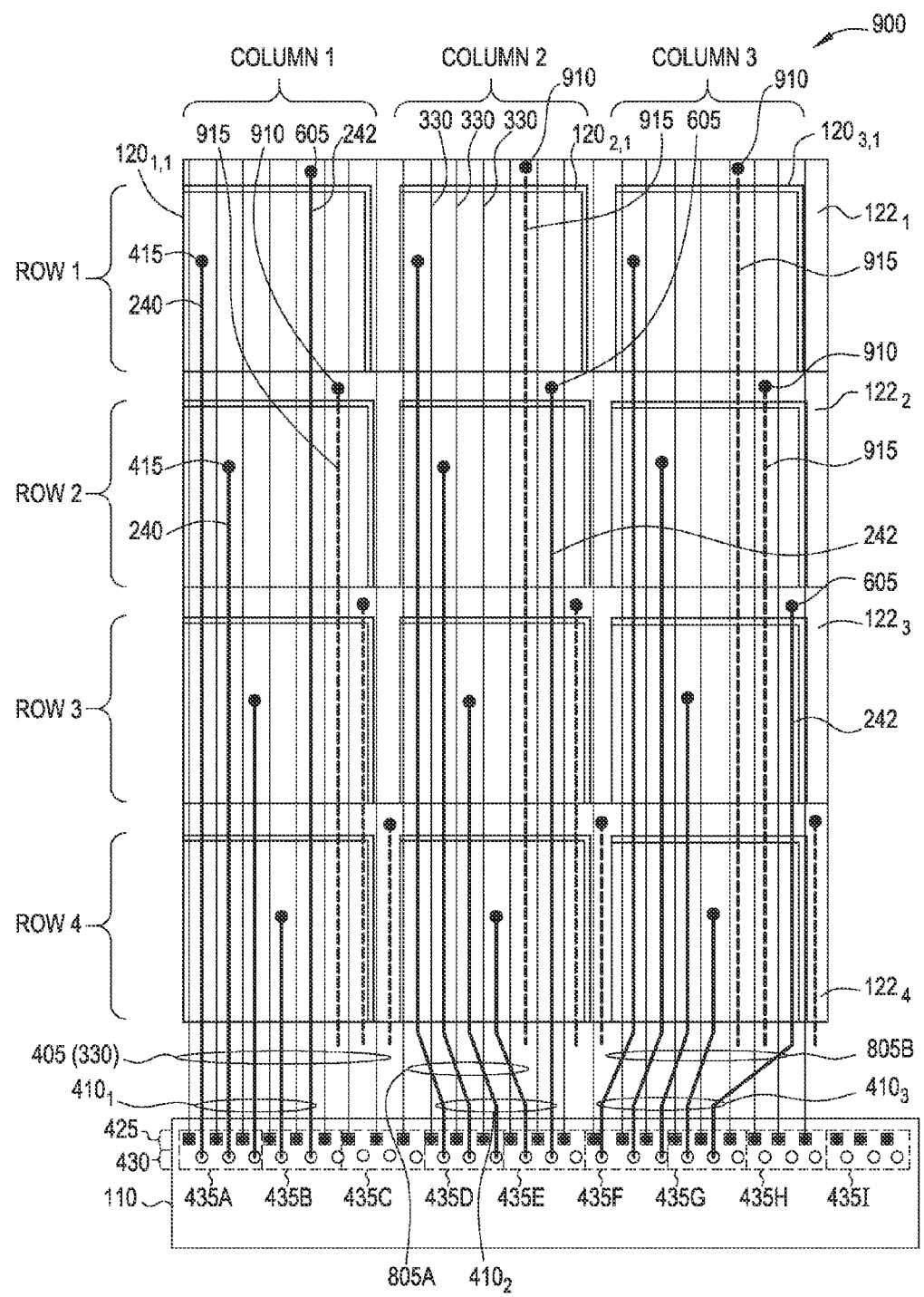
FIG. 9 illustrates an exemplary arrangement of vias in a regular pattern and supporting sensing with one or more grid electrodes, according to one embodiment.

FIG. 9 illustrates an exemplary arrangement of vias in a regular pattern and supporting sensing with one or more grid electrodes, according to one embodiment. The arrangement 900 includes segmented grid electrodes $122_1$-$122_4$ (individually or collectively, grid electrodes 122), each corresponding to a particular row of sensor electrodes 120 and at least partly circumscribing those sensor electrodes 120. For example, grid electrode $122_1$ at least partly circumscribes the sensor electrodes $120_{1,1}$, $120_{2,1}$, and $120_{3,1}$ of Row 1. Although the grid electrodes 122 are shown as partially circumscribing sensor electrodes of a particular row across multiple columns, in some embodiments a particular grid electrode 122 may partly or wholly circumscribe sensor electrodes 120 of two or more different rows and one or more columns.

As discussed above, the grid electrodes 122 can be operated by the processing system 110 as part of performing sensing. Accordingly, grid electrodes 122 are coupled with the processing system 110 at several pads 430. The grid electrodes 122 connect with the processing system 110 using routing traces 242 coupled with vias 605. The routing traces 242 may generally have similar properties as the routing traces 240 used to connect the sensor electrodes 120 with the processing system 110, and the vias 605 may generally have similar properties as vias 415. In some cases, routing traces 242 may cross over one or more source lines 330 to connect with a particular pad 430 of the processing system 110. For example, the routing trace 242 included in sensing column $410_3$ crosses three (3) source lines 330 to connect with a center pad 430 of group 435G, which has an adjacent position to the last connection of the routing traces 240 of the sensing column $410_3$. However, as seen in sensing column $410_2$, the routing trace 242 of a particular sensing column 410 might not cross source lines 330 even though other routing traces 240 cross source lines 330 to align with groups 435D, 435E.

In some embodiments, the vias 605 are included with vias 415 in the plurality of vias forming a regular pattern within the areal extent of the sensing region. In order to maintain the regular pattern, the plurality of vias may also include one or more dummy vias 910 that connect with the grid electrodes 122 but not with the processing system 110. In some embodiments, the dummy vias 910 are further coupled with dummy traces 915 disposed in parallel with the source lines 330 and routing traces 240. The dummy traces 910 may have similar characteristics as the dummy traces 420 described above. Connecting the dummy traces 910 to the grid electrodes 122 may be beneficial for sensing performance, as the dummy traces 910 are held at the same potential as the grid electrodes 122, and are not floating. While not shown, arrangement 900 may also include (segments of) dummy traces 420, such as inline with one or more of the routing traces 240. Although not depicted, in some embodiments a plurality of routing traces 240, 242 may be coupled with a respective sensor electrode 120 or a grid electrode 122. The number of multiple routing traces 240, 242 may be selected based on a desired signal settling speed (that is, based on resistance and capacitance values) for the sensor electrode 120 or grid electrode 122.

Figure 10:
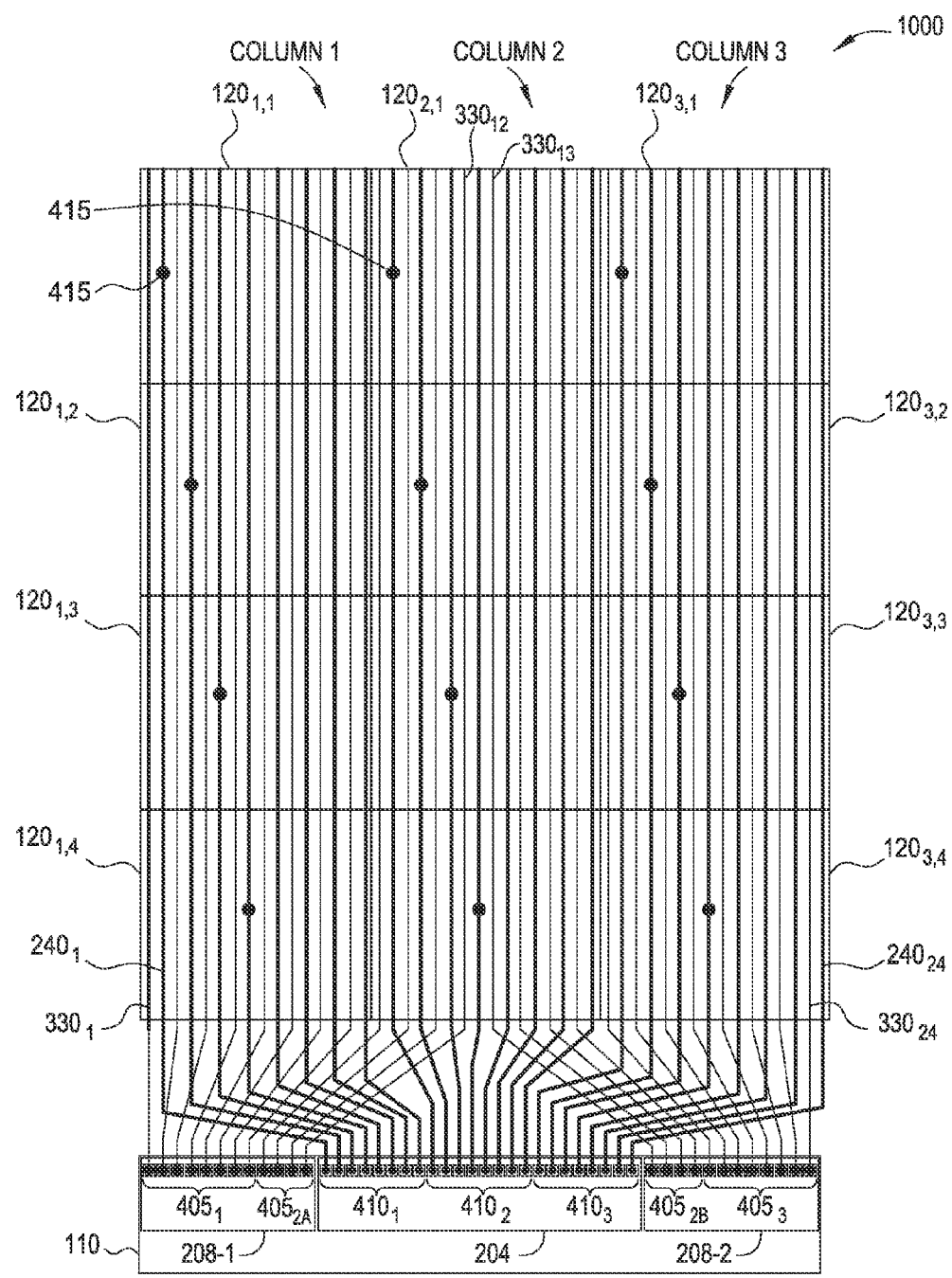
FIG. 10 illustrates an implementation of a processing system including multiple portions of a display driver module, according to one embodiment.

FIG. 10 illustrates an implementation of a processing system including multiple portions of a display driver module, according to one embodiment. Arrangement 1000 may generally be used with the assembly 340, and provides an implementation in which the processing system 110 includes multiple portions of display driver module 208. The portions 208-1, 208-2 may be distinct ICs, and the processing system 110 may include the sensing module 204 disposed between the two portions 208-1, 208-2. In alternative embodiments, processing system 110 may include more than two portions of the display driver module 208 and/or two or more portions of the sensing module 204, which may be disposed in any suitable arrangement.

Arrangement 1000 includes twenty-four (24) routing traces 240 and twenty-four (24) source lines 330, although other numbers of each are possible. For example, the arrangement 1000 may alternatively include a number of dummy traces, one or more grid electrodes, and so forth. Each display column 405 corresponds to eight (8) source lines 330, and each sensing column 410 corresponds to eight (8) routing traces 240. The arrangement 1000 further includes a regular pattern of vias 415 connected with routing traces 240, similar to that depicted in FIGS. 4 and 6. Portion 208-1 includes twelve (12) pads, eight of which connect to routing traces 240 of display column $405_1$ and four of which connect to routing traces 240 of display column portion $405_{2A}$. Portion 208-2 also includes twelve (12) pads, eight of which connect to routing traces 240 of display column $405_3$ and four of which connect to routing traces 240 of display column portion $405_{2B}$. Thus, the display column $405_2$ is controlled partially by portion 208-1 and partially by portion 208-2. The processing system 110 may include circuitry for synchronizing timing of the portions 208-1, 208-2, as well as with the sensing module 204.

Sensing module 204 includes twenty-four (24) pads, and couples with routing traces 240 of sensing columns $410_1$-$410_3$. In this embodiment, a relatively larger number of routing traces 240 may overlap with source lines 330. Accordingly, arrangement 1000 may provide spatial separation between routing traces 240 and source lines 330, and/or processing system 110 may provide time and/or frequency separation through generated signals, as discussed above. Additionally, processing system 110 may perform operations to mitigate or compensate for the effects of display updating on sensing, and vice versa.

Figure 11:
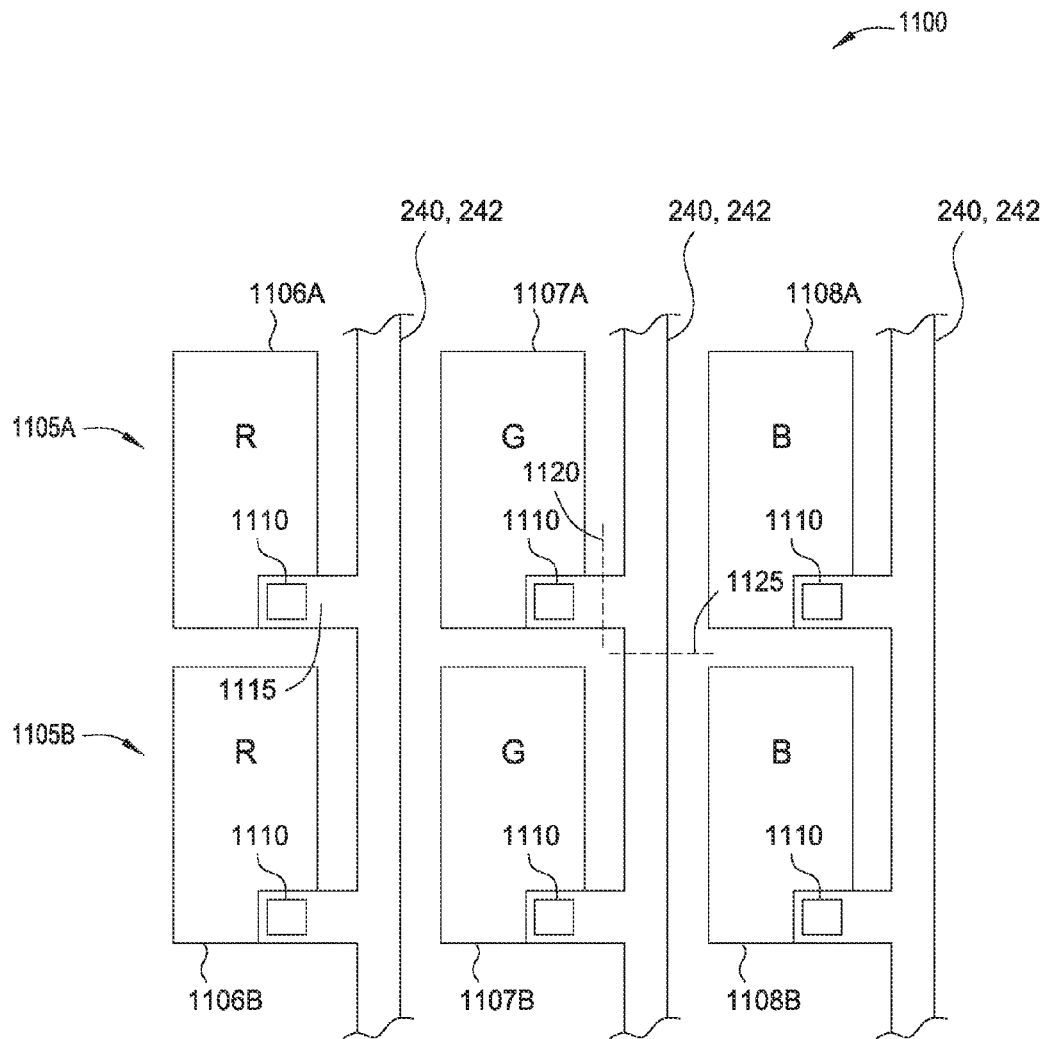
FIG. 11 illustrates techniques for selectively connecting a plurality of routing traces with an arrangement of vias in a regular pattern, according to one embodiment.

FIG. 11 illustrates techniques for selectively connecting a plurality of routing traces with an arrangement of vias in a regular pattern, according to one embodiment. Arrangement 1100 generally provides an enlarged view of a portion of display panel 300 (FIG. 3), consistent with any of the embodiments described herein.

Arrangement 1100 includes two adjacent pixels 1105A, 1105B. Each pixel 1105A, 1105B includes a respective red sub-pixel 1106A, 1106B, a respective green sub-pixel 1107A, 1107B, and a respective blue sub-pixel 1108A, 1108B. Any other suitable pixel geometries for a display are also possible, such as red/green/blue/yellow, red/green/blue/white, red/green/blue/yellow/cyan, and so forth. The pixels 1105A, 1105B may be included in a display material layer 320 (FIG. 3) separate from the layers of the assembly 340. The source lines and gate lines used to operate the pixels 1105A, 1105B are not depicted.

A number of vias 1110 are included in the arrangement 1100 and are arranged in a regular pattern. The vias 1110 are used to selectively couple sensor electrodes 120 (not shown) with routing traces 240, 242. As shown, each via 1110 overlaps a corresponding sub-pixel; the vias 1110 correspond to the sub-pixels in a 1:1 ratio. The vias 1110 may be included in any of the vias (e.g., 415, 605) or dummy vias (e.g., 910) described herein. For example, vias 1110 correspond to vias 415, 605, or 910 in a 1:1 ratio. In another example, more than one via 1110 corresponds to a single via 415, 605, or 910.

In alternative embodiments, the positioning of vias 1110 relative to sub-pixels, the ratio of vias 1110 to sub-pixels, etc. may vary so long as the overall pattern of vias remains regular. For example, the vias 1110 may be arranged to not overlap a sub-pixel, to overlap more than one sub-pixel, and so forth. Each via 1110 is coupled with a conductive connection 1115 that is selectively connected with the routing traces 240, 242.

In some embodiments, the connection 1115 may be severed along a vertical cut line 1120, such that a via 1110 is not coupled with the corresponding routing trace 240, 242. In these cases, the connection 1115 might be formed in the metal to already include the discontinuity, the discontinuity might be added later (e.g., by cutting or etching), or the connection 1115 might not be formed at all. In one example, say a particular routing trace 242 connects with a grid electrode 122 disposed outside the view of arrangement 1100. If the illustrated vias 1110 connect with a sensor electrode 120, the vias 1110 that are disposed along the particular routing trace 242 may be disconnected from the routing trace 242 so that the grid electrode does not short with the sensor electrode.

Additionally, the routing traces 240, 242 may be severed along a horizontal cut line 1125 to selectively connect sensor electrodes and/or grid electrodes and/or an associated processing system. Alternative cut patterns or locations of discontinuities are also possible.

Figure 12:
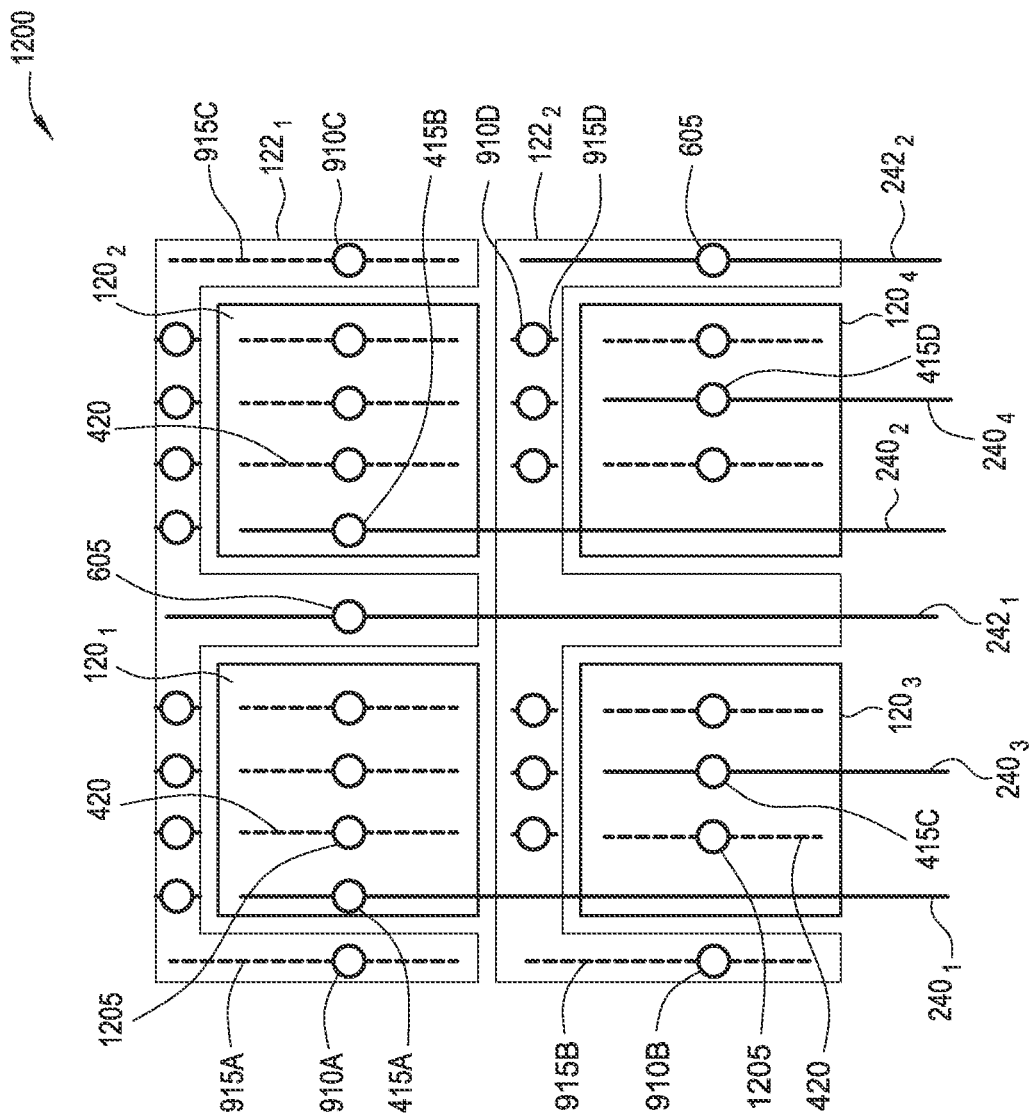
FIG. 12 is a functional diagram of an exemplary arrangement of vias in a regular pattern relative to an array of sensor elements including grid electrodes, according to one embodiment.

FIG. 12 is a functional diagram of an exemplary arrangement of vias in a regular pattern relative to an array of sensor elements including grid electrodes, according to one embodiment. Arrangement 1200 displays a plurality of sensor electrodes $120_1$-$120_4$ that are partially circumscribed by grid electrodes $122_1$, $122_2$. A plurality of routing traces $240_1$-$240_4$ connect with the sensor electrodes $120_1$-$120_4$ at respective vias 415A-415D. A plurality of routing traces $242_1$, $242_2$ connect with the grid electrodes $122_1$, $122_2$ at respective vias 605. Arrangement 1200 also includes a plurality of dummy electrodes 420, 915A-915D connected with respective dummy vias 1205, 910A-910D.

Figure 13:
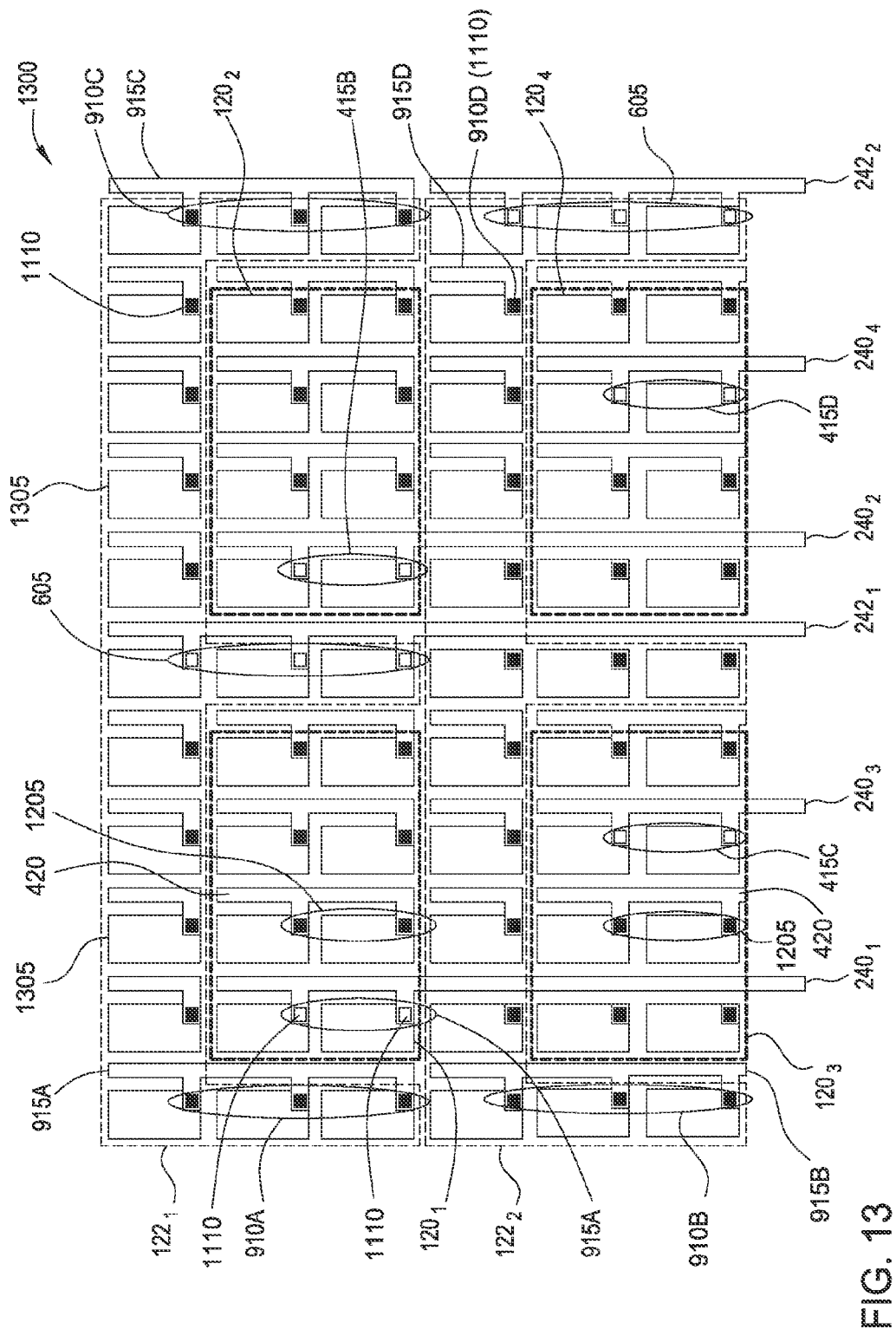
FIG. 13 illustrates an exemplary configuration of a plurality of routing traces to implement the arrangement of vias depicted in FIG. 12, according to one embodiment.

FIG. 13 illustrates an exemplary configuration of a plurality of routing traces to implement the arrangement of vias depicted in FIG. 12, according to one embodiment. More specifically, arrangement 1300 shows the functional diagram of FIG. 12 relative to a number of sub-pixels 1305 (which may represent any of the sub-pixels 1106, 1107, 1108 discussed above). The arrangement 1300 may provide a regular pattern of a plurality of vias at one or more levels, each of which can simplify the inspection process as well as improving performance consistency of the completed product. For instance, at a first level, the arrangement 1300 provides a regular pattern of the vias 1110 corresponding to each sub-pixel 1305. At another level, the arrangement 1300 provides a regular pattern of the vias 415A-415D and vias 605 (each of which may include one or more of the vias 1110) used to connect with various sensor electrodes and grid electrodes. At yet another level, the arrangement 1300 can provide a regular pattern of dummy vias (e.g., including dummy vias 910A-910D, 1205).

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. An input device comprising:
   a plurality of sensor electrodes disposed in a first layer, a sensing region defined proximate to the plurality of sensor electrodes;
   a processing system configured to detect presence of input objects in the sensing region;
   a plurality of routing traces disposed in a second layer and coupled with the processing system; and
   a plurality of vias arranged in a regular pattern within an areal extent of the sensing region, wherein at least a portion of the plurality of vias couple the plurality of sensor electrodes with the plurality of routing traces.

2. The input device of claim 1, further comprising:
   a plurality of source lines disposed in a layer outside the second layer and configured to be driven to perform display updating,
   wherein at least a first routing trace of the plurality of routing traces is routed across at least one of the plurality of source lines.

3. The input device of claim 2, further comprising:
   a display device including the plurality of source lines, the processing system coupled with the plurality of source lines and further configured for performing display updating,
   wherein at least a second routing trace of the plurality of routing traces is disposed parallel to at least one of the plurality of source lines.

4. The input device of claim 1, further comprising:
   a grid electrode disposed in the first layer and at least partly disposed between two of the plurality of sensor electrodes,
   wherein the grid electrode is coupled with the processing system through one of the plurality of vias and one of the plurality of routing traces.

5. The input device of claim 1, wherein the plurality of sensor electrodes are disposed in a matrix configuration having a plurality of rows and a plurality of columns, wherein sensor electrodes disposed in a same row are each coupled with a respective via disposed in a same location relative to the sensor electrode.

6. The input device of claim 1, wherein the plurality of vias includes a plurality of dummy vias that are not coupled with the plurality of routing traces.

7. The input device of claim 6, further comprising a plurality of dummy traces disposed in parallel with the plurality of routing traces and that are not coupled with the processing system, wherein at least one of the plurality of dummy vias is coupled with at least one of the plurality of dummy traces.

8. A display device having an integrated capacitive sensing device, the display device comprising:
   a plurality of source lines configured to perform display updating;
   a plurality of routing traces, at least one of the plurality of routing traces being disposed parallel to at least one of the plurality of source lines;
   a plurality of sensor electrodes configured to perform capacitive sensing of input objects in a sensing region defined proximate to the plurality of sensor electrodes, each sensor electrode corresponding to one or more segments of a common voltage electrode; and
   a plurality of vias arranged in a regular pattern with an areal extent of the sensing region, wherein at least a portion of the plurality of vias couple the plurality of sensor electrodes with the plurality of routing traces.

9. The display device of claim 8, wherein the plurality of routing traces are disposed in a first layer and the plurality of source lines are disposed in a second layer,
   wherein at least one of the plurality of routing traces is routed across at least one of the plurality of source lines.

10. The display device of claim 8, further comprising a grid electrode disposed at least partly between two of the plurality of sensor electrodes, the grid electrode corresponding to one or more segments of the common voltage electrode and coupled with one of the plurality of routing traces through one of the plurality of vias.

11. The display device of claim 8, wherein the plurality of sensor electrodes are disposed in a matrix configuration having a plurality of rows and a plurality of columns, wherein sensor electrodes disposed in a same row are each coupled with a respective via disposed in a same location relative to the sensor electrode.

12. The display device of claim 8, wherein the plurality of vias includes a plurality of dummy vias that are not coupled with the plurality of routing traces.

13. The display device of claim 12, further comprising a plurality of dummy traces disposed in parallel with the plurality of routing traces and that are not coupled with the processing system, wherein at least one of the plurality of dummy vias is coupled with at least one of the plurality of dummy traces.

14. An assembly for an input device, the assembly comprising:
   a plurality of sensor electrodes disposed in a first layer and arranged to define a sensing region;
   a plurality of routing traces disposed in a second layer and configured to couple with a processing system; and
   a plurality of vias arranged in a regular pattern within an areal extent of the sensing region, wherein at least a portion of the plurality of vias couple the plurality of sensor electrodes with the plurality of routing traces.

15. The assembly of claim 14, further comprising:
   a plurality of source lines disposed in a layer outside the second layer and configured to couple with the processing system for performing display updating,
   wherein at least a first routing trace of the plurality of routing traces is routed across at least one of the plurality of source lines.

16. The assembly of claim 15, wherein at least a second routing trace of the plurality of routing traces is disposed parallel to at least one of the plurality of source lines.

17. The assembly of claim 14, further comprising:
   a grid electrode disposed in the first layer and at least partly disposed between two of the plurality of sensor electrodes,
   wherein the grid electrode is configured to couple with the processing system through one of the plurality of vias and one of the plurality of routing traces.

18. The assembly of claim 14, wherein the plurality of sensor electrodes are disposed in a matrix configuration having a plurality of rows and a plurality of columns, wherein sensor electrodes disposed in a same row are each coupled with a respective via disposed in a same location relative to the sensor electrode.

19. The assembly of claim 14, wherein the plurality of vias includes a plurality of dummy vias that are not coupled with the plurality of routing traces.

20. The assembly of claim 19, further comprising a plurality of dummy traces disposed in parallel with the plurality of routing traces, wherein at least one of the plurality of dummy vias is coupled with at least one of the plurality of dummy traces.

* * * * *